United States Patent
Knight et al.

(10) Patent No.: US 8,600,728 B2
(45) Date of Patent: Dec. 3, 2013

(54) TRAINING FOR A TEXT-TO-TEXT APPLICATION WHICH USES STRING TO TREE CONVERSION FOR TRAINING AND DECODING

(75) Inventors: Kevin Knight, Marina Del Rey, CA (US); Michel Galley, New York, NY (US); Mark Hopkins, Saarbruecken (DE); Daniel Marcu, Hermosa Beach, CA (US); Ignacio Thayer, San Francisco, CA (US)

(73) Assignee: University of Southern California, Los Angeles, CA (US)

( * ) Notice: Subject to any disclaimer, the term of this patent is extended or adjusted under 35 U.S.C. 154(b) by 992 days.

(21) Appl. No.: 11/250,151

(22) Filed: Oct. 12, 2005

(65) Prior Publication Data
US 2006/0142995 A1    Jun. 29, 2006

Related U.S. Application Data

(60) Provisional application No. 60/618,244, filed on Oct. 12, 2004, provisional application No. 60/618,366, filed on Oct. 12, 2004.

(51) Int. Cl.
*G06F 17/28* (2006.01)
*G06F 17/27* (2006.01)

(52) U.S. Cl.
USPC .................................. 704/2; 4/3; 4/4; 4/5; 4/9

(58) Field of Classification Search
USPC ........................................................ 704/1–10
See application file for complete search history.

(56) References Cited

U.S. PATENT DOCUMENTS

| | | | |
|---|---|---|---|
| 4,502,128 | A | 2/1985 | Okajima et al. |
| 4,599,691 | A | 7/1986 | Sakaki et al. |
| 4,615,002 | A | 9/1986 | Innes |
| 4,661,924 | A | 4/1987 | Okamoto et al. |
| 4,787,038 | A | 11/1988 | Doi et al. |
| 4,791,587 | A | 12/1988 | Doi |
| 4,800,522 | A | 1/1989 | Miyao et al. |
| 4,814,987 | A | 3/1989 | Miyao et al. |

(Continued)

FOREIGN PATENT DOCUMENTS

| | | |
|---|---|---|
| EP | 0469884 A2 | 2/1992 |
| EP | 0715265 A2 | 6/1996 |

(Continued)

OTHER PUBLICATIONS

Owen Rambow, Srinivas Bangalore. Corpus-based lexical choice in natural language generation, Proceedings of the 38th Annual Meeting on Association for Computational Linguistics. 2000.*

(Continued)

*Primary Examiner* — Pierre-Louis Desir
*Assistant Examiner* — Matthew Baker
(74) *Attorney, Agent, or Firm* — Carr & Ferrell LLP

(57) ABSTRACT

Training and translation using trees and/or subtrees as parts of the rules. A target language is word aligned with a source language, and at least one of the languages is parsed into trees. The trees are used for training, by aligning conversion steps, forming a manual set of information representing the conversion steps and then learning rules from that reduced set. The rules include subtrees as parts thereof, and are used for decoding, along with an n-gram language model and a syntax based language mode.

40 Claims, 15 Drawing Sheets

(56) References Cited

U.S. PATENT DOCUMENTS

| | | | |
|---|---|---|---|
| 4,942,526 | A | 7/1990 | Okajima et al. |
| 4,980,829 | A | 12/1990 | Okajima et al. |
| 5,020,112 | A | 5/1991 | Chou |
| 5,088,038 | A | 2/1992 | Tanaka et al. |
| 5,091,876 | A | 2/1992 | Kumano et al. |
| 5,146,405 | A | 9/1992 | Church |
| 5,167,504 | A | 12/1992 | Mann |
| 5,181,163 | A | 1/1993 | Nakajima et al. |
| 5,212,730 | A | 5/1993 | Wheatley et al. |
| 5,218,537 | A | 6/1993 | Hemphill et al. |
| 5,220,503 | A | 6/1993 | Suzuki et al. |
| 5,267,156 | A | 11/1993 | Nomiyama |
| 5,268,839 | A | 12/1993 | Kaji |
| 5,295,068 | A | 3/1994 | Nishino et al. |
| 5,302,132 | A | 4/1994 | Corder |
| 5,311,429 | A | 5/1994 | Tominaga |
| 5,387,104 | A | 2/1995 | Corder |
| 5,408,410 | A | 4/1995 | Kaji |
| 5,432,948 | A | 7/1995 | Davis et al. |
| 5,442,546 | A | 8/1995 | Kaji et al. |
| 5,477,450 | A | 12/1995 | Takeda et al. |
| 5,477,451 | A | 12/1995 | Brown et al. |
| 5,495,413 | A | 2/1996 | Kutsumi et al. |
| 5,497,319 | A | 3/1996 | Chong et al. |
| 5,510,981 | A | 4/1996 | Berger et al. |
| 5,528,491 | A | 6/1996 | Kuno et al. |
| 5,535,120 | A | 7/1996 | Chong et al. |
| 5,541,836 | A | 7/1996 | Church et al. |
| 5,541,837 | A | 7/1996 | Fushimoto |
| 5,548,508 | A | 8/1996 | Nagami |
| 5,644,774 | A | 7/1997 | Fukumochi et al. |
| 5,675,815 | A | 10/1997 | Yamauchi et al. |
| 5,687,383 | A | 11/1997 | Nakayama et al. |
| 5,696,980 | A | 12/1997 | Brew |
| 5,724,593 | A | 3/1998 | Hargrave, III et al. |
| 5,752,052 | A | 5/1998 | Richardson et al. |
| 5,754,972 | A | 5/1998 | Baker et al. |
| 5,761,631 | A | 6/1998 | Nasukawa |
| 5,761,689 | A | 6/1998 | Rayson et al. |
| 5,768,603 | A | 6/1998 | Brown et al. |
| 5,779,486 | A | 7/1998 | Ho et al. |
| 5,781,884 | A | 7/1998 | Pereira et al. |
| 5,794,178 | A | 8/1998 | Caid et al. |
| 5,805,832 | A | 9/1998 | Brown et al. |
| 5,806,032 | A | 9/1998 | Sproat |
| 5,819,265 | A | 10/1998 | Ravin et al. |
| 5,826,219 | A | 10/1998 | Kutsumi |
| 5,826,220 | A | 10/1998 | Takeda et al. |
| 5,845,143 | A | 12/1998 | Yamauchi et al. |
| 5,848,385 | A | 12/1998 | Poznanski et al. |
| 5,848,386 | A | 12/1998 | Motoyama |
| 5,855,015 | A | 12/1998 | Shoham |
| 5,864,788 | A | 1/1999 | Kutsumi |
| 5,867,811 | A | 2/1999 | O'Donoghue |
| 5,870,706 | A | 2/1999 | Alshawi |
| 5,893,134 | A | 4/1999 | O'Donoghue et al. |
| 5,903,858 | A | 5/1999 | Saraki |
| 5,907,821 | A | 5/1999 | Kaji et al. |
| 5,909,681 | A | 6/1999 | Passera et al. |
| 5,930,746 | A | 7/1999 | Ting |
| 5,966,685 | A | 10/1999 | Flanagan et al. |
| 5,966,686 | A * | 10/1999 | Heidorn et al. ............... 704/9 |
| 5,983,169 | A | 11/1999 | Kozma |
| 5,987,402 | A | 11/1999 | Murata et al. |
| 5,987,404 | A | 11/1999 | Della Pietra et al. |
| 5,991,710 | A | 11/1999 | Papineni et al. |
| 5,995,922 | A | 11/1999 | Penteroudakis et al. |
| 6,018,617 | A | 1/2000 | Sweitzer et al. |
| 6,031,984 | A | 2/2000 | Walser |
| 6,032,111 | A | 2/2000 | Mohri |
| 6,047,252 | A | 4/2000 | Kumano et al. |
| 6,064,819 | A | 5/2000 | Franssen et al. |
| 6,064,951 | A | 5/2000 | Park et al. |
| 6,073,143 | A | 6/2000 | Nishikawa et al. |
| 6,077,085 | A | 6/2000 | Parry et al. |
| 6,092,034 | A | 7/2000 | McCarley et al. |
| 6,119,077 | A | 9/2000 | Shinozaki |
| 6,131,082 | A | 10/2000 | Hargrave, III et al. |
| 6,161,082 | A | 12/2000 | Goldberg et al. |
| 6,182,014 | B1 | 1/2001 | Kenyon et al. |
| 6,182,027 | B1 | 1/2001 | Nasukawa et al. |
| 6,205,456 | B1 | 3/2001 | Nakao |
| 6,206,700 | B1 | 3/2001 | Brown et al. |
| 6,223,150 | B1 | 4/2001 | Duan et al. |
| 6,233,544 | B1 | 5/2001 | Alshawi |
| 6,233,545 | B1 | 5/2001 | Datig |
| 6,233,546 | B1 | 5/2001 | Datig |
| 6,236,958 | B1 | 5/2001 | Lange et al. |
| 6,269,351 | B1 | 7/2001 | Black |
| 6,275,789 | B1 | 8/2001 | Moser et al. |
| 6,278,967 | B1 | 8/2001 | Akers et al. |
| 6,278,969 | B1 | 8/2001 | King et al. |
| 6,285,978 | B1 | 9/2001 | Bernth et al. |
| 6,289,302 | B1 | 9/2001 | Kuo |
| 6,304,841 | B1 | 10/2001 | Berger et al. |
| 6,311,152 | B1 | 10/2001 | Bai et al. |
| 6,317,708 | B1 | 11/2001 | Witbrock et al. |
| 6,327,568 | B1 | 12/2001 | Joost |
| 6,330,529 | B1 | 12/2001 | Ito |
| 6,330,530 | B1 | 12/2001 | Horiguchi et al. |
| 6,356,864 | B1 | 3/2002 | Foltz et al. |
| 6,360,196 | B1 | 3/2002 | Poznanski et al. |
| 6,389,387 | B1 | 5/2002 | Poznanski et al. |
| 6,393,388 | B1 | 5/2002 | Franz et al. |
| 6,393,389 | B1 | 5/2002 | Chanod et al. |
| 6,415,250 | B1 | 7/2002 | van den Akker |
| 6,460,015 | B1 | 10/2002 | Hetherington et al. |
| 6,470,306 | B1 | 10/2002 | Pringle et al. |
| 6,473,729 | B1 | 10/2002 | Gastaldo et al. |
| 6,480,698 | B2 | 11/2002 | Ho et al. |
| 6,490,549 | B1 | 12/2002 | Ulicny et al. |
| 6,498,921 | B1 | 12/2002 | Ho et al. |
| 6,502,064 | B1 | 12/2002 | Miyahira et al. |
| 6,529,865 | B1 | 3/2003 | Duan et al. |
| 6,535,842 | B1 | 3/2003 | Roche et al. |
| 6,587,844 | B1 | 7/2003 | Mohri |
| 6,609,087 | B1 | 8/2003 | Miller et al. |
| 6,647,364 | B1 | 11/2003 | Yumura et al. |
| 6,691,279 | B2 | 2/2004 | Yoden et al. |
| 6,745,161 | B1 | 6/2004 | Arnold et al. |
| 6,745,176 | B2 | 6/2004 | Probert, Jr. et al. |
| 6,757,646 | B2 | 6/2004 | Marchisio |
| 6,778,949 | B2 | 8/2004 | Duan et al. |
| 6,782,356 | B1 | 8/2004 | Lopke |
| 6,810,374 | B2 | 10/2004 | Kang |
| 6,848,080 | B1 * | 1/2005 | Lee et al. ............... 715/203 |
| 6,857,022 | B1 | 2/2005 | Scanlan |
| 6,885,985 | B2 | 4/2005 | Hull |
| 6,901,361 | B1 | 5/2005 | Portilla |
| 6,904,402 | B1 | 6/2005 | Wang et al. |
| 6,952,665 | B1 | 10/2005 | Shimomura et al. |
| 6,983,239 | B1 | 1/2006 | Epstein |
| 6,996,518 | B2 | 2/2006 | Jones et al. |
| 6,996,520 | B2 | 2/2006 | Levin |
| 6,999,925 | B2 | 2/2006 | Fischer et al. |
| 7,013,262 | B2 | 3/2006 | Tokuda et al. |
| 7,016,827 | B1 | 3/2006 | Ramaswamy et al. |
| 7,016,977 | B1 | 3/2006 | Dunsmoir et al. |
| 7,024,351 | B2 | 4/2006 | Wang |
| 7,031,911 | B2 | 4/2006 | Zhou et al. |
| 7,050,964 | B2 | 5/2006 | Menzes et al. |
| 7,085,708 | B2 | 8/2006 | Manson |
| 7,089,493 | B2 | 8/2006 | Hatori et al. |
| 7,103,531 | B2 | 9/2006 | Moore |
| 7,107,204 | B1 | 9/2006 | Liu et al. |
| 7,107,215 | B2 | 9/2006 | Ghali |
| 7,113,903 | B1 | 9/2006 | Riccardi et al. |
| 7,143,036 | B2 | 11/2006 | Weise |
| 7,146,358 | B1 | 12/2006 | Gravano et al. |
| 7,149,688 | B2 | 12/2006 | Schalkwyk |
| 7,171,348 | B2 | 1/2007 | Scanlan |
| 7,174,289 | B2 | 2/2007 | Sukehiro |
| 7,177,792 | B2 | 2/2007 | Knight et al. |
| 7,191,115 | B2 | 3/2007 | Moore |

(56) References Cited

U.S. PATENT DOCUMENTS

| | | | |
|---|---|---|---|
| 7,194,403 B2 | 3/2007 | Okura et al. | |
| 7,197,451 B1 | 3/2007 | Carter et al. | |
| 7,206,736 B2 | 4/2007 | Moore | |
| 7,209,875 B2 | 4/2007 | Quirk et al. | |
| 7,219,051 B2 | 5/2007 | Moore | |
| 7,239,998 B2 | 7/2007 | Xun | |
| 7,249,012 B2 | 7/2007 | Moore | |
| 7,249,013 B2 | 7/2007 | Al-Onaizan et al. | |
| 7,283,950 B2 | 10/2007 | Pournasseh et al. | |
| 7,295,962 B2 | 11/2007 | Marcu | |
| 7,302,392 B1 | 11/2007 | Thenthiruperai et al. | |
| 7,319,949 B2 | 1/2008 | Pinkham | |
| 7,340,388 B2 | 3/2008 | Soricut et al. | |
| 7,346,487 B2 | 3/2008 | Li | |
| 7,346,493 B2 | 3/2008 | Ringger et al. | |
| 7,349,839 B2 | 3/2008 | Moore | |
| 7,349,845 B2 | 3/2008 | Coffman et al. | |
| 7,356,457 B2 | 4/2008 | Pinkham et al. | |
| 7,369,998 B2 | 5/2008 | Sarich et al. | |
| 7,373,291 B2 | 5/2008 | Garst | |
| 7,383,542 B2 | 6/2008 | Richardson et al. | |
| 7,389,222 B1 | 6/2008 | Langmead et al. | |
| 7,389,234 B2 | 6/2008 | Schmid et al. | |
| 7,403,890 B2 | 7/2008 | Roushar | |
| 7,409,332 B2 | 8/2008 | Moore | |
| 7,409,333 B2 | 8/2008 | Wilkinson et al. | |
| 7,447,623 B2* | 11/2008 | Appleby | 704/2 |
| 7,454,326 B2* | 11/2008 | Marcu et al. | 704/2 |
| 7,496,497 B2 | 2/2009 | Liu | |
| 7,533,013 B2 | 5/2009 | Marcu | |
| 7,536,295 B2 | 5/2009 | Cancedda et al. | |
| 7,546,235 B2 | 6/2009 | Brockett et al. | |
| 7,552,053 B2 | 6/2009 | Gao et al. | |
| 7,565,281 B2* | 7/2009 | Appleby | 704/2 |
| 7,574,347 B2 | 8/2009 | Wang | |
| 7,580,830 B2 | 8/2009 | Al-Onaizan et al. | |
| 7,620,538 B2 | 11/2009 | Marcu et al. | |
| 7,620,632 B2* | 11/2009 | Andrews | 1/1 |
| 7,624,005 B2 | 11/2009 | Koehn et al. | |
| 7,624,020 B2 | 11/2009 | Yamada et al. | |
| 7,627,479 B2 | 12/2009 | Travieso et al. | |
| 7,680,646 B2 | 3/2010 | Lux-Pogodalla et al. | |
| 7,689,405 B2 | 3/2010 | Marcu | |
| 7,698,124 B2 | 4/2010 | Menezes et al. | |
| 7,698,125 B2* | 4/2010 | Graehl et al. | 704/5 |
| 7,707,025 B2* | 4/2010 | Whitelock | 704/5 |
| 7,711,545 B2 | 5/2010 | Koehn | |
| 7,716,037 B2 | 5/2010 | Precoda et al. | |
| 7,813,918 B2 | 10/2010 | Muslea et al. | |
| 7,822,596 B2 | 10/2010 | Elgazzar et al. | |
| 7,925,494 B2 | 4/2011 | Cheng et al. | |
| 7,957,953 B2 | 6/2011 | Moore | |
| 7,974,833 B2 | 7/2011 | Soricut et al. | |
| 8,060,360 B2 | 11/2011 | He | |
| 8,145,472 B2 | 3/2012 | Shore et al. | |
| 8,214,196 B2* | 7/2012 | Yamada et al. | 704/2 |
| 8,244,519 B2 | 8/2012 | Bicici et al. | |
| 8,415,472 B2 | 4/2013 | Chung et al. | |
| 2001/0009009 A1 | 7/2001 | Iizuka | |
| 2001/0029455 A1 | 10/2001 | Chin et al. | |
| 2002/0002451 A1 | 1/2002 | Sukehiro | |
| 2002/0013693 A1 | 1/2002 | Fuji | |
| 2002/0040292 A1 | 4/2002 | Marcu | |
| 2002/0046018 A1 | 4/2002 | Marcu et al. | |
| 2002/0046262 A1 | 4/2002 | Heilig et al. | |
| 2002/0059566 A1 | 5/2002 | Delcambre et al. | |
| 2002/0078091 A1 | 6/2002 | Vu et al. | |
| 2002/0087313 A1 | 7/2002 | Lee et al. | |
| 2002/0099744 A1 | 7/2002 | Coden et al. | |
| 2002/0111788 A1 | 8/2002 | Kimpara | |
| 2002/0111789 A1 | 8/2002 | Hull | |
| 2002/0111967 A1 | 8/2002 | Nagase | |
| 2002/0143537 A1 | 10/2002 | Ozawa et al. | |
| 2002/0152063 A1 | 10/2002 | Tokieda et al. | |
| 2002/0169592 A1 | 11/2002 | Aityan | |
| 2002/0188438 A1 | 12/2002 | Knight et al. | |
| 2002/0188439 A1 | 12/2002 | Marcu | |
| 2002/0198699 A1 | 12/2002 | Greene et al. | |
| 2002/0198701 A1 | 12/2002 | Moore | |
| 2003/0009322 A1 | 1/2003 | Marcu | |
| 2003/0023423 A1 | 1/2003 | Yamada et al. | |
| 2003/0144832 A1 | 7/2003 | Harris | |
| 2003/0154071 A1 | 8/2003 | Shreve | |
| 2003/0158723 A1 | 8/2003 | Masuichi et al. | |
| 2003/0176995 A1 | 9/2003 | Sukehiro | |
| 2003/0182102 A1* | 9/2003 | Corston-Oliver et al. | 704/9 |
| 2003/0191626 A1 | 10/2003 | Al-Onaizan et al. | |
| 2003/0204400 A1 | 10/2003 | Marcu et al. | |
| 2003/0216905 A1 | 11/2003 | Chelba et al. | |
| 2003/0217052 A1 | 11/2003 | Rubenczyk et al. | |
| 2003/0233222 A1 | 12/2003 | Soricut et al. | |
| 2004/0015342 A1 | 1/2004 | Garst | |
| 2004/0024581 A1 | 2/2004 | Koehn et al. | |
| 2004/0030551 A1 | 2/2004 | Marcu et al. | |
| 2004/0035055 A1 | 2/2004 | Zhu et al. | |
| 2004/0044530 A1 | 3/2004 | Moore | |
| 2004/0059708 A1 | 3/2004 | Dean et al. | |
| 2004/0068411 A1 | 4/2004 | Scanlan | |
| 2004/0098247 A1 | 5/2004 | Moore | |
| 2004/0102956 A1 | 5/2004 | Levin | |
| 2004/0102957 A1 | 5/2004 | Levin | |
| 2004/0111253 A1 | 6/2004 | Luo et al. | |
| 2004/0115597 A1 | 6/2004 | Butt | |
| 2004/0122656 A1 | 6/2004 | Abir | |
| 2004/0167768 A1 | 8/2004 | Travieso et al. | |
| 2004/0167784 A1 | 8/2004 | Travieso et al. | |
| 2004/0193401 A1 | 9/2004 | Ringger et al. | |
| 2004/0230418 A1 | 11/2004 | Kitamura | |
| 2004/0237044 A1 | 11/2004 | Travieso et al. | |
| 2004/0260532 A1 | 12/2004 | Richardson et al. | |
| 2005/0021322 A1 | 1/2005 | Richardson et al. | |
| 2005/0021517 A1 | 1/2005 | Marchisio | |
| 2005/0026131 A1 | 2/2005 | Elzinga et al. | |
| 2005/0033565 A1 | 2/2005 | Koehn | |
| 2005/0038643 A1 | 2/2005 | Koehn | |
| 2005/0055199 A1 | 3/2005 | Ryzchachkin et al. | |
| 2005/0060160 A1 | 3/2005 | Roh et al. | |
| 2005/0075858 A1 | 4/2005 | Pournasseh et al. | |
| 2005/0086226 A1 | 4/2005 | Krachman | |
| 2005/0102130 A1 | 5/2005 | Quirk et al. | |
| 2005/0125218 A1 | 6/2005 | Rajput et al. | |
| 2005/0149315 A1 | 7/2005 | Flanagan et al. | |
| 2005/0171757 A1* | 8/2005 | Appleby | 704/2 |
| 2005/0228640 A1* | 10/2005 | Aue et al. | 704/9 |
| 2005/0228643 A1 | 10/2005 | Munteanu et al. | |
| 2005/0234701 A1 | 10/2005 | Graehl et al. | |
| 2005/0267738 A1 | 12/2005 | Wilkinson et al. | |
| 2006/0004563 A1 | 1/2006 | Campbell et al. | |
| 2006/0015320 A1 | 1/2006 | Och | |
| 2006/0015323 A1 | 1/2006 | Udupa et al. | |
| 2006/0018541 A1 | 1/2006 | Chelba et al. | |
| 2006/0020448 A1 | 1/2006 | Chelba et al. | |
| 2006/0041428 A1 | 2/2006 | Fritsch et al. | |
| 2006/0095248 A1* | 5/2006 | Menezes et al. | 704/3 |
| 2006/0111891 A1* | 5/2006 | Menezes et al. | 704/3 |
| 2006/0111892 A1* | 5/2006 | Menezes et al. | 704/7 |
| 2006/0111896 A1 | 5/2006 | Menezes et al. | |
| 2006/0129424 A1 | 6/2006 | Chan | |
| 2006/0150069 A1 | 7/2006 | Chang | |
| 2006/0167984 A1 | 7/2006 | Fellenstein et al. | |
| 2006/0190241 A1 | 8/2006 | Goutte et al. | |
| 2007/0016400 A1 | 1/2007 | Soricutt et al. | |
| 2007/0016401 A1 | 1/2007 | Ehsani et al. | |
| 2007/0033001 A1 | 2/2007 | Muslea et al. | |
| 2007/0050182 A1 | 3/2007 | Sneddon et al. | |
| 2007/0078654 A1 | 4/2007 | Moore | |
| 2007/0078845 A1 | 4/2007 | Scott et al. | |
| 2007/0083357 A1 | 4/2007 | Moore et al. | |
| 2007/0094169 A1 | 4/2007 | Yamada et al. | |
| 2007/0112553 A1 | 5/2007 | Jacobson | |
| 2007/0112555 A1* | 5/2007 | Lavi et al. | 704/9 |
| 2007/0112556 A1* | 5/2007 | Lavi et al. | 704/9 |
| 2007/0122792 A1 | 5/2007 | Galley et al. | |
| 2007/0168202 A1 | 7/2007 | Changela et al. | |

(56) References Cited

U.S. PATENT DOCUMENTS

| | | | |
|---|---|---|---|
| 2007/0168450 A1 | 7/2007 | Prajapat et al. | |
| 2007/0180373 A1 | 8/2007 | Bauman et al. | |
| 2007/0219774 A1 | 9/2007 | Quirk et al. | |
| 2007/0250306 A1 | 10/2007 | Marcu et al. | |
| 2007/0265825 A1 | 11/2007 | Cancedda et al. | |
| 2007/0265826 A1 | 11/2007 | Chen et al. | |
| 2007/0269775 A1 | 11/2007 | Andreev et al. | |
| 2007/0294076 A1 | 12/2007 | Shore et al. | |
| 2008/0052061 A1 | 2/2008 | Kim et al. | |
| 2008/0065478 A1 | 3/2008 | Kohlmeier et al. | |
| 2008/0114583 A1 | 5/2008 | Al-Onaizan et al. | |
| 2008/0154581 A1* | 6/2008 | Lavi et al. | 704/9 |
| 2008/0183555 A1 | 7/2008 | Walk | |
| 2008/0215418 A1 | 9/2008 | Kolve et al. | |
| 2008/0249760 A1 | 10/2008 | Marcu et al. | |
| 2008/0270109 A1 | 10/2008 | Och | |
| 2008/0270112 A1 | 10/2008 | Shimohata | |
| 2008/0281578 A1 | 11/2008 | Kumaran et al. | |
| 2008/0307481 A1 | 12/2008 | Panje | |
| 2009/0076792 A1 | 3/2009 | Lawson-Tancred | |
| 2009/0083023 A1 | 3/2009 | Foster et al. | |
| 2009/0119091 A1 | 5/2009 | Sarig | |
| 2009/0125497 A1 | 5/2009 | Jiang et al. | |
| 2009/0234634 A1 | 9/2009 | Chen et al. | |
| 2009/0241115 A1 | 9/2009 | Raffo et al. | |
| 2009/0326912 A1 | 12/2009 | Ueffing | |
| 2010/0017293 A1 | 1/2010 | Lung et al. | |
| 2010/0042398 A1 | 2/2010 | Marcu et al. | |
| 2010/0138213 A1 | 6/2010 | Bicici et al. | |
| 2010/0174524 A1 | 7/2010 | Koehn | |
| 2011/0029300 A1 | 2/2011 | Marcu et al. | |
| 2011/0082684 A1 | 4/2011 | Soricut et al. | |

FOREIGN PATENT DOCUMENTS

| | | |
|---|---|---|
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |

OTHER PUBLICATIONS

Stephan Vogel Ying, Ying Zhang, Fei Huang, Alicia Tribble, Ashish Venugopal, Bing Zhao, Alex Weibel. The CMU Statistical Machine Translation System, In Proceedings of MT Summit IX. 2003.*

Nizar Habash. The Use of a Structural N-gram Language Model in Generation-Heavy Hybrid Machine Translation. University of Maryland University Institute for Advanced Computer Studies. Sep. 8, 2004.*

Shankar Kumar and William Byrne. Minimum Bayes-Risk Decoding for Statistical Machine Translation. HLTNAACL conference. Mar. 2004.*

Och et al. A Smorgasbord of Features for Statistical Machine Translation. HLTNAACL conference. Mar. 2004.*

Kenji Yamada and Kevin Knight. A Decoder for Syntax-based Statistical MT. 40th annual meeting for ACL. Jul. 2002.*

Jason Eisner, Computer Science Dept., Johns Hopkins Univ. Learning Non-Isomorphic Tree Mappings for Machine Translation. 2003.*

Gildea, D. 2003. Loosely tree-based alignment for machine translation. In Proceedings of the 41st Annual Meeting on Association for Computational Linguistics—vol. 1 (Sapporo, Japan, Jul. 7-12, 2003). Annual Meeting of the ACL. Association for Computational Linguistics, Morristown, NJ, 80-87. DOI= http://dx.doi.org/10.3115/1075096.1075107.*

Daniel Gildea. 2003. Loosely tree-based alignment for machine translation. In Proceedings of the 41st Annual Meeting on Association for Computational Linguistics—vol. 1 (ACL '03), vol. 1. Association for Computational Linguistics, Stroudsburg, PA, USA, 80-87.*

J. Graehl, K. Knight. May 2004. Training tree transducers. In NAACL-HLT (2004), pp. 105-112.*

M. Galley, M. Hopkins, K. Knight, D. Marcu. What's in a translation rule? In NAACL-HLT (2004), pp. 273-280. May 2004.*

Heidi J. Fox. 2002. Phrasal cohesion and statistical machine translation. In Proceedings of the ACL-02 conference on Empirical methods in natural language processing—vol. 10 (EMNLP '02), vol. 10. Association for Computational Linguistics, Stroudsburg, PA, USA, 304-3111.*

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondecnes in Bilingual Corpora," In Proceedings of the 31st Annual Meeting of the ACL, 1993, pp. 17-22.

Kurohashi, S. and Nagao, M., "Automatic Detection of Discourse Structure by Checking Surface Information in Sentences," 1994, Proc. of COL-LING '94, vol. 2, pp. 1123-1127.

Langkilde, I. and Knight, K., "Generation that Exploits Corpus-Based Statistical Knowledge," 1998, Proc. of the COLING-ACL, pp. 704-710.

Langkilde, I. and Knight, K., "The Practical Value of N-Grams in Generation," 1998, Proc. of the 9th International Natural Language Generation Workshop, pp. 248-255.

Langkilde, Irene, "Forest-Based Statistical Sentence Generation," 2000, Proc. of the 1st Conference on North American chapter of the ACL, Seattle, WA, pp. 170-177.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde-Geary, Irene, "An Empirical Verification of Coverage and Correctness for a General-Purpose Sentence Generator," 1998, Proc. 2nd Int'l Natural Language Generation Conference.

Lee-Y.S.,"Neural Network Approach to Adaptive Learning: with an Application to Chinese Homophone Disambiguation," IEEE pp. 1521-1526.

Lita, L., et al., "tRuEcasing," Proceedings of the 41st Annual Meeting of the Assoc. for Computational Linguistics (In Hinrichs, E. and Roth, D.- editors), pp. 152-159.

Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACLIEACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

(56) References Cited

OTHER PUBLICATIONS

Marcu, Daniel, "Towards a Unified Approach to Memory- and Statistical-Based Machine Translation," 2001, Proc. of the 39th Annual Meeting of the ACL, pp. 378-385.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
MeLamed, I. Dan, "A Word-to-Word Model of Translational Equivalence," 1997, Proc. of the 35th Annual Meeting of the ACL, Madrid, Spain, pp. 490-497.
MeLamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
MeLamed, I. Dan, "Empirical Methods for Exploiting Parallel Texts," 2001, MIT Press, Cambridge, MA [table of contents].
Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Metze, F. et al., "The NESPOLE! Speech-to-Speech Translation System," Proc. of the HLT 2002, 2nd Int'l Conf. on Human Language Technology (San Francisco, CA), © 2002, pp. 378-383.
Mikheev et al., "Named Entity Recognition without Gazeteers," 1999, Proc. of European Chapter of the ACL, Bergen, Norway, pp. 1-8.
Miike et al., "A full-text retrieval system with a dynamic abstract generation function," 1994, Proceedings of SI-GIR '94, pp. 152-161.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Mohri, Mehryar, "Regular Approximation of Context Free Grammars Through Transformation", 2000, pp. 251-261, "Robustness in Language and Speech Technology", Chapter 9, Kluwer Academic Publishers.
Monasson et al., "Determining computational complexity from characteristic 'phase transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Niessen,S. and Ney, H, "Toward hierarchical models for statistical machine translation of inflected languages," 2001, Data-Driven Machine Translation Workshop, Toulouse, France, pp. 47-54.
Norvig, Peter, "Techniques for Automatic Memoization with Applications to Context-Free Parsing", Compuational Linguistics,1991, pp. 91-98, vol. 17, No. 1.
Och et al., "Improved Alignment Models for Statistical Machine Translation," 1999, Proc. of the Joint Conf. of Empirical Methods in Natural Language Processing and Very Large Corpora, pp. 20-28.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och, F. and Ney, H, "Improved Statistical Alignment Models," 2000, 38th Annual Meeting of the ACL, Hong Kong, pp. 440-447.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Och, F. and Ney, H., "A Systematic Comparison of Various Statistical Alignment Models," Computational Linguistics, 2003, 29:1, 19-51.
Papineni et al., "Bleu: a Method for Automatic Evaluation of Machine Translation," 2001, IBM Research Report, RC22176(WQ102-022).
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Rayner et al.,"Hybrid Language Processing in the Spoken Language Translator," IEEE, pp. 107-110.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hili Book Company [redacted].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Ruiqiang, Z. et al., "The NiCT-ATR Statistical Machine Translation System for the IWSLT 2006 Evaluation," submitted to IWSLT, 2006.
Russell, S. and Norvig, P., "Artificial Intelligence: A Modern Approach," 1995, Prentice-Hall, Inc., New Jersey [redacted—table of contents].
Sang, E. and Buchholz, S., "Introduction to the CoNLL-2000 Shared Task: Chunking," 20002, Proc. of CoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on Word Sense Disabiguation, vol. 24, Issue 1, pp. 97-123.
Selman et al., "A New Method for Solving Hard Satisfiability Problems," 1992, Proc. of the 10th National Conference on Artificial Intelligence, San Jose, CA, pp. 440-446.
Shapiro, Stuart (ed.), "Encyclopedia of Artificial Intelligence, 2nd edition", vol. D 2,1992, John Wiley & Sons Inc; "Unification" article, K. Knight, pp. 1630-1637.
Shirai, S., "A Hybrid Rule and Example-based Method for Machine Translation," NTT Communication Science Laboratories, pp. 1-5.
Sobashima et al., "A Bidirectional Transfer-Driven Machine Translation System for Spoken Dialogues," 1994, Proc. of 15th Conference on Computational Linguistics, vol. 1, pp. 64-68.

(56) References Cited

OTHER PUBLICATIONS

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sumita et al., "A Discourse Structure Analyzer for Japanese Text," 1992, Proc. of the International Conference on Fifth Generation Computer Systems, vol. 2, pp. 1133-1140.
Sun et al., "Chinese Named Entity Identification Using Class-based Language Model," 2002, Proc. of 19th International Conference on Computational Linguistics, Taipei, Taiwan, vol. 1, pp. 1-7.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Comuputational Linguistics, Morristown, NJ.
Taylor et al., "The Penn Treebank: An Overview," in A. Abeill (ed.), D Treebanks: Building and Using Parsed Corpora, 2003, pp. 5-22.
Tiedemann, Jorg, "Automatic Construction of Weighted String Similarity Measures," 1999, In Proceedings of the Joint SIGDAT Conference on Emperical Methods in Natural Language Processing and Very Large Corpora.
Tillman, C. and Xia, F., "A Phrase-Based Unigram Model for Statistical Machine Translation," 2003, Proc. of the North American Chapter of the ACL on Human Language Technology, vol. 2, pp. 106-108.
Tillmann et al., "A DP based Search Using Monotone Alignments in Statistical Translation," 1997, Proc. of the Annual Meeting of the ACL, pp. 366-372.
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-based Methods and Machine Learning Models," Natural Language Processing (Shizen Gengo Shori), vol. 10, No. 3, Apr. 2003, pp. 87-114.
Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation).
Ueffing et al., "Generation of Word Graphs in Statistical Machine Translation," 2002, Proc. of Empirical Methods in Natural Language Processing (EMNLP), pp. 156-163.
Varga et al, "Parallel corpora for medium density languages", In Proceedings of RANLP 2005, pp. 590-596.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Vogel, S. and Ney, H., "Construction of a Hierarchical Translation Memory," 2000, Proc. of Cooling 2000, Saarbrucken, Germany, pp. 1131-1135.
Wang, Y. and Waibel, A., "Decoding Algorithm in Statistical Machine Translation," 1996, Proc. of the 35th Annual Meeting of the ACL, pp. 366-372.
Wang, Ye-Yi, "Grammar Inference and Statistical Machine Translation," 1998, Ph.D Thesis, Carnegie Mellon University, Pittsburgh, PA.
Watanabe et al., "Statistical Machine Translation Based on Hierarchical Phrase Alignment," 2002, 9th International Conference on Theoretical and Methodologicl Issues in Machin Translation (TMI-2002), Keihanna, Japan, pp. 188-198.
Witbrock, M. and Mittal, V., "Ultra-Summarization: A Statistical Approach to Generating Highly Condensed Non-Extractive Summries," 1999, Proc. Of SIGIR '99, 22nd Intrnational Conference on Research and Development in Information Retrieval, Berkeley, CA, pp. 315-316.
Wu, Dekai, "A Polynomial-Time Algorithm for Statistical Machine Translation," 1996, Proc. of 34th Annual Meeting of the ACL, pp. 152-158.
Wu, Dekai, "Stochastic Inversion Transduction Grammars and Bilingual Parsing of Parallel Corpora," 1997, Computational Linguistics, vol. 23, Issue 3, pp. 377-403.
Yamada, K. and Knight, K. "A Syntax-based Statistical Translation Model," D 2001, Proc. of the 39th Annual Meeting of the ACL, pp. 523-530.
Yamada K., "A Syntax-Based Statistical Translation Model," 2002 PhD Dissertation, pp. 1-141.
Yamamoto et al., "A Comparative Study on Translation Units for Bilingual Lexicon Extraction," 2001, Japan Academic Association for Copyright Clearance, Tokyo, Japan.
Yamamoto et al, "Acquisition of Phrase-level Bilingual Correspondence using Dependency Structure" In Proceedings of COLING-2000, pp. 933-939.
Yarowsky, David, "Unsupervised Word Sense Disambiguation Rivaling Supervised Methods," 1995, 33rd Annual Meeting of the ACL, pp. 189-196.
Zhang et al., "Synchronous Binarization for Machine Translations," Jun. 4-9, 2006, in Proc. of the Human Language Technology Conference of the North American Chapter of the ACL, pp. 256-263.
Zhang et al., "Distributed Language Modeling for N-best List Reranking," in Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
"Patent Cooperation Treaty International Preliminary Report on Patentability and the Written Opinion, International application No. PCT/US2008/004296, Oct. 6, 2009, 5 pgs."
Document, Wikipedia.com, web.archive.org (Feb. 24, 2004) <http://web.archive.org/web/20040222202831 /http://en.wikipedia.org/wikiiDocument>, Feb, 24, 2004.
Identifying, Dictionary.com, wayback.archive.org (Feb. 28, 2007) <http://wayback.archive.org/web/200501 01 OOOOOO*/http://dictionary.reference.com//browse//identifying>, Feb 28, 2005 <http://web.archive.org/web/20070228150533/http://dictionary.reference.com/browse/identifying>.
Abney, Steven P. , "Parsing by Chunks," 1991, Principle-Based Parsing: Computation and Psycholinguistics, vol. 44,pp. 257-279.
Agbago, A., et al., "True-casing for the Portage System," In Recent Advances in Natural Language Processing (Borovets, Bulgaria), Sep. 21-23, 2005, pp. 21-24.
Al-Onaizan et al., "Statistical Machine Translation," 1999, JHU Summer Tech Workshop, Final Report, pp. 1-42.
Al-Onaizan et al., "Translating with Scarce Resources," 2000, 17th National Conference of the American Association for Artificial Intelligence, Austin, TX, pp. 672-678.
Al-Onaizan, Y. and Knight K., "Machine Transliteration of Names in Arabic Text," Proceedings of ACL Workshop on Computational Approaches to Semitic Languages. Philadelphia, 2002.
Al-Onaizan, Y. and Knight, K., "Named Entity Translation: Extended Abstract", 2002, Proceedings of HLT-02, San Diego, CA.
Al-Onaizan, Y. and Knight, K., "Translating Named Entities Using Monolingual and Bilingual Resources," 2002, Proc. of the 40th Annual Meeting of the ACL, pp. 400-408.
Alshawi et al., "Learning Dependency Translation Models as Collections of Finite-State Head Transducers," 2000, Computational Linguistics, vol. 26, pp. 45-60.
Alshawi, Hiyan, "Head Automata for Speech Translation", Proceedings of the ICSLP 96, 1996, Philadelphia, Pennslyvania.
Ambati, V., "Dependency Structure Trees in Syntax Based Machine Translation," Spring 2008 Report <http://www.cs.cmu.edu/~vamshi/publications/DependencyMT_report.pdf>, pp. 1-8.

(56) References Cited

OTHER PUBLICATIONS

Arbabi et al., "Algorithms for Arabic name transliteration," Mar. 1994, IBM Journal of Research and Development, vol. 38, Issue 2, pp. 183-194.
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Ballesteros, L. et al., "Phrasal Translation and Query Expansion Techniques for Cross-Language Information," SIGIR 97, Philadelphia, PA, © 1997, pp. 84-91.
Bangalore, S. and Rambow, 0., "Evaluation Metrics for Generation," 2000, Proc. of the 1st International Natural Language Generation Conf., vol. 14, pp. 1-8.
Bangalore, S. and Rambow, 0., "Using TAGs, a Tree Model, and a Language Model for Generation," May 2000, Workshop TAG+5, Paris.
Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation," 2000, Proc. of 18th conf. on Computational Linguistics, vol. 1, pp. 42-48.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.
Barnett et al., "Knowledge and Natural Language Processing," Aug. 1990, Communications of the ACM, vol. 33, Issue 8, pp. 50-71.
Baum, Leonard, "An Inequality and Associated Maximization Technique in Statistical Estimation for Probabilistic Functions of Markov Processes", 1972, Inequalities 3:1-8.
Berhe, G. et al., "Modeling Service-baed Multimedia Content Adaptation in Pervasive Computing," CF '04 (Ischia, Italy) Apr. 14-16, 2004, pp. 60-69.
Boitet, C. et al., "Main Research Issues in Building Web Services," Proc. of the 6th Symposium on Natural Language Processing, Human and Computer Processing of Language and Speech, © 2005, pp. 1-11.
Brants, Thorsten, "TnT—A Statistical Part-of-Speech Tagger," 2000, Proc. of the 6th Applied Natural Language Processing Conference, Seattle.
Brill, Eric, "Transformation-Based Error-Driven Learning and Natural Language Processing: A Case Study in Part of Speech Tagging", 1995, Assocation for Computational Linguistics, vol. 21, No. 4, pp. 1-37.
Brill, Eric. "Transformation-Based Error-Driven Learning and Natural Language Processing: A Case Study in Part of Speech Tagging",1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., "The Mathematics of Statistical Machine Translation: Parameter D Estimation," 1993, Computational Linguistics, vol. 19, Issue 2, pp. 263-311.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Callan et al., "TREC and TIPSTER Experiments with Inquery," 1994, Information Processing and Management, vol. 31, Issue 3, pp. 327-343.
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

Carl, Michael. "A Constructivist Approach to Machine Translation," 1998, New Methods of Language Processing and Computational Natural Language Learning, pp. 247-256.
Chen, K. and Chen, H., "Machine Translation: An Integrated Approach," 1995, Proc. of 6th Int'l Cont. on Theoretical and Methodological Issue in MT, pp. 287-294.
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-dictionary String Matching Using n-gram Hashing," 1998, Information Processing and Management, vol. 34, No. 4, pp. 443-464.
Cohen, Yossi, "Interpreter for FUF," (available at ftp:/lftp.cs.bgu.ac.il/ pUb/people/elhadad/fuf-life.lf).
Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15.
Covington, "An Algorithm to Align Words for Historical Comparison", Computational Linguistics, 1996, 22(4), pp. 481-496.
Dagan, I. and Itai, A., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab, M. and Finch, S., "A Statistical Word-Level Translation Model for Comparable Corpora," 2000, In Proc.of the Conference on Content Based Multimedia Information Access (RIAO).
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Elhadad et al., "Floating Constraints in Lexical Choice", 1996, ACL, 23(2): 195-239.
Elhadad, M. and Robin, J., "An Overview of Surge: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
"Elhadad, Michael, ""FUF: the Universal Unifier User Manual Version 5.2""", 1993, Department of Computer Science,Ben Gurion University, Beer Sheva, Israel."
"Elhadad, Michael, ""Using Argumentation to Control Lexical Choice: A Functional Unification Implementation"",1992, Ph.D. Thesis, Graduate School of Arts and Sciences, Columbia University."
"Elhadad. M., and Robin, J., ""SURGE: a Comprehensive Plug-in Syntactic Realization Component for Text Generation"", 1999 (available at http://www.cs.bgu.ac.il/-elhadad/pub.html),"
Fleming, Michael et al., "Mixed-Initiative Translation of Web Pages," AMTA 2000, LNAI 1934, Springer-Verlag, Berlin, Germany, 2000, pp. 25-29.
Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> 'retrieved on May 6, 2004! abstract.

(56) References Cited

OTHER PUBLICATIONS

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.
Fung et al, "Mining Very-non parallel corpora: Parallel sentence and lexicon extractioin via bootstrapping and EM", In EMNLP 2004.
"Fung, P. and Yee, L., ""An IR Approach for Translating New Words from Nonparallel, Comparable Texts""", 1998,36th Annual Meeting of the ACL, 17th International Conference on Computational Linguistics, pp. 414-420."
"Fung, Pascale, ""Compiling Bilingual Lexicon Entries From a Non-Parallel English-Chinese Corpus""", 1995, Proc. of the Third Workshop on Very Large Corpora, Boston, MA, pp. 173-183."
"Gale, W. and Church, K., ""A Program for Aligning Sentences in Bilingual Corpora,""" 1991, 29th Annual Meeting of the ACL, pp. 177-183."
Gale, W. and Church, K., "A Program for Aligning Sentences in Bilingual Corpora," 1993, Computational Linguisitcs, vol. 19, No. 1, pp. 177-184.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.
"Germann et al., ""Fast Decoding and Optimal Decoding for Machine Translation""", 2001, Proc. of the 39th Annual Meeting of the ACL, Toulouse, France, pp. 228-235."
"Germann, Ulrich: ""Building a Statistical Machine Translation System from Scratch: How Much Bang for theBuck Can We Expect?""" Proc. of the Data-Driven MT Workshop of ACL-01, Toulouse, France, 2001."
"Grefenstette, Gregory, ""The World Wide Web as a Resource for Example-Based Machine Translation Tasks""", 1999, Translating and the Computer 21, Proc. of the 21 st International Cant. on Translating and the Computer. London, UK, 12 pp."
Grossi et al, "Suffix Trees and their applications in string algorithms", In. Proceedings of the 1st South American Workshop on String Processing, Sep. 1993, pp. 5776.
Gupta et al., "Kelips: Building an Efficient and Stable P2P DHT thorough Increased Memory and Background Overhead," 2003 IPTPS, LNCS 2735, pp. 160-169.
"Hatzivassiloglou, V. et al., ""Unification-Based Glossing""",. 1995, Proc. of the International Joint Conference on Aritificial Intelligence, pp. 1382-1389."
Huang et al., "Relabeling Syntax Trees to Improve Syntax-Based Machine Translation Quality," Jun. 4-9, 2006, in Proc. of the Human Language Technology Conference of the North America Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
"Jelinek, F., ""Fast Sequential Decoding Algorithm Using a Stack""", Nov. 1969, IBM J. Res. Develop., vol. 13, No. 6, pp. 675-685."
"Jones, K. Sparck, ""Experiments in Relevance Weighting of Search Terms""", 1979, Information Processing &Management, vol. 15, Pergamon Press Ltd., UK, pp. 133-144."
Klein et al., "Accurate Unlexicalized Parsing," Jul. 2003m, in Proc. of the 41st Annual Meeting of the ACL, pp. 423-430.
"Knight et al., ""Integrating Knowledge Bases and Statistics in MT,""" 1994, Proc. of the Conference of the Association for Machine Translation in the Americas."

"Knight et al., ""Filling Knowledge Gaps in a Broad-Coverage Machine Translation System""", 1995, Proc. ofthe14th International Joint Conference on Artificial Intelligence, Montreal, Canada, vol. 2, pp. 1390-1396."
"Knight, K. and Al-Onaizan, Y., ""A Primer on Finite-State Software for Natural Language Processing""", 1999 (available at http://www.isLedullicensed-sw/carmel)."
Knight, K. and Al-Onaizan, Y., "Translation with Finite -State Devices," Proceedings of the 4th AMTA Conference, 1998.
"Knight, K. and Chander, I., ""Automated Postediting of Documents,""" 1994, Proc. of the 12th Conference on Artificial Intelligence, pp. 779-784."
Knight, K. and Graehl, J., "Machine Transliteration", 1997, Proc. of the ACL-97, Madrid, Spain, pp. 128-135.
"Knight, K. and Hatzivassiloglou, V., ""Two-Level, Many-Paths Generation,""" D 1995, Proc. of the 33rd Annual Conference of the ACL, pp. 252-260."
"Knight, K. and Luk, S., ""Building a Large-Scale Knowledge Base for Machine Translation,""" 1994, Proc. of the 12th Conference on Artificial Intelligence, pp. 773-778."
"Knight, K. and Marcu, D., ""Statistics-Based Summarization—Step One: Sentence Compression,""" 2000, American Association for Artificial Intelligence Conference, pp. 703-710."
"Knight, K. and Yamada, K., ""A Computational Approach to Deciphering Unknown Scripts,""" 1999, Proc. of the ACL Workshop on Unsupervised Learning in Natural Language Processing."
"Knight, Kevin, ""A Statistical MT Tutorial Workbook,""" 1999, JHU Summer Workshop (available at http://www.isLedu/natural-language/mUwkbk.rtf)."
Knight, Kevin, "Automating Knowledge Acquisition for Machine Translation," 1997, Al Magazine 18(4).
"Knight, Kevin, ""Connectionist Ideas and Algorithms,""" Nov. 1990, Communications of the ACM, vol. 33, No. 11, pp. 59-74."
"Knight, Kevin, ""Decoding Complexity in Word-Replacement Translation Models""", 1999, Computational Linguistics,25(4)."
"Knight, Kevin, ""Integrating Knowledge Acquisition and Language Acquisition""", May 1992, Journal of Applied Intelligence, vol. 1, No. 4."
"Knight, Kevin, ""Learning Word Meanings by Instruction,""" 1996, Proc. of the D National Conference on Artificial Intelligence, vol. 1, pp. 447-454."
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
"Koehn, P. and Knight, K., ""ChunkMT: Statistical Machine Translation with Richer Linguistic Knowledge,""" Apr. 2002,Information Sciences Institution."
Koehn, P., et al, "Statistical Phrase-Based Translation," Proceedings of HLT-NAACL 2003 Main Papers , pp. 48-54 Edmonton, May-Jun. 2003.
Abney, S.P., "Stochastic Attribute Value Grammars", Association for Computional Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.Idc.upenn.edu/W/W02/W02-1039.pdf>.
Tillman, C., et al, "Word Reordering and a Dynamic Programming Beam Search Algorithm for Statistical Machine Translation" <URL: http://acl.Idc.upenn.edu/J/J03/J03-1005.pdf>.
Wang, W., et al. "Capitalizing Machine Translation" in HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.Idc.upenn.edu/W/W00/W00-0507.pdf>.
Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.

(56) References Cited

OTHER PUBLICATIONS

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. of the 40th Annual Meeting of the Association for Computational Linguistics (ACL), Philadelphia, PA, 2002.

Yasuda et al., "Automatic Machine Translation Selection Scheme to Output the Best Result," Proc of LREC, 2002, pp. 525-528.

"Bangalore, S. and Rambow, O., ""Using TAGs, a Tree Model, and a Language Model for Generation,"" May 2000,Workshop TAG+5, Paris."

Gale, W. and Church, K., "A Program for Aligning Sentences in Bilingual Corpora," 1993, Computational Linguisitcs, vol. 19, No. 1, pp. 75-102.

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in Contrast—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Jan. 3, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 1, 2013 in Japanese Patent Application 2007-536911 filed Oct. 12, 2005.

Office Action mailed May 13, 2005 in Chinese Patent Application 1812317.1, filed May 11, 2001.

Office Action mailed Apr. 21, 2006 in Chinese Patent Application 1812317.1, filed May 11, 2001.

Office Action mailed Jul. 19, 2006 in Japanese Patent Application 2003-577155, filed Mar. 11, 2003.

Office Action mailed 2007 in Chinese Patent Application 3805749.2, filed Mar. 11, 2003.

Office Action mailed Feb. 27, 2007 in Japanese Patent Application 2002-590018, filed May 13, 2002.

Office Action mailed Jan. 26, 2007 in Chinese Patent Application 3807018.9, filed Mar. 27, 2003.

Office Action mailed Dec. 7, 2005 in Indian Patent Application 2283/DELNP/2004, filed Mar. 11, 2003.

Office Action mailed Mar. 31, 2009 in European Patent Application 3714080.3, filed Mar. 11, 2003.

Agichtein et al., "Snowball: Extracting Information from Large Plain-Text Collections," ACM DL '00, the Fifth ACM Conference on Digital Libraries, Jun. 2, 2000, San Antonio, TX, USA.

Satake, Masaomi, "Anaphora Resolution for Named Entity Extraction in Japanese Newspaper Articles," Master's Thesis [online], Feb. 15, 2002, School of Information Science, Jaist, Nomi, Ishikaw, Japan.

Office Action mailed Aug. 29, 2006 in Japanese Patent Application 2003-581064, filed Mar. 27, 2003.

Office Action mailed Jan. 26, 2007 in Chinese Patent Application 3807027.8, filed Mar. 28, 2003.

Office Action mailed Jul. 25, 2006 in Japanese Patent Application 2003-581063, filed Mar. 28, 2003.

Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.

Melamed et al., "Statistical machine translation by generalized parsing," 2005, Technical Report 05-001, Proteus Project, New York University, http://nlp.cs.nyu.edu/pubs/.

Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.

Huang et al., "Statistical syntax-directed translation with extended domain of locality," Jun. 9, 2006, In Proceedings of AMTA, pp. 1-8.

\* cited by examiner

TRAINING FOR A TEXT-TO-TEXT APPLICATION WHICH USES STRING TO TREE CONVERSION FOR TRAINING AND DECODING

CLAIM OF PRIORITY

This application claims priority under 35 USC §119(e) to U.S. patent application Ser. Nos. 60/618,244 and 60/618,366, both filed on Oct. 12, 2004, the entire contents of which are hereby incorporated by reference.

STATEMENT REGARDING FEDERALLY SPONSORED RESEARCH OR DEVELOPMENT

This invention was made with government support under Contract No. N66001-00-1-8914 awarded by the Space and Naval Warfare Systems Command. The government has certain rights in the invention.

BACKGROUND

Modern machine translation systems use word to word and phrase to phrase probabilistic channel models as well as probabilistic n-gram language models.

A conventional way of translating using machine translation is illustrated in FIG. 1. FIG. 1 illustrates the concept of Chinese and English as being the language pair, but it should be understood that any other language pair may be alternatively used.

Training is shown as 150, where a training corpora 153 is used. The corpora has an English string 151 and a Chinese string 152. An existing technique may be used to align the words in the training corpora at a word level. The aligned words are input to a training module 155 which is used to form probabilities 165 based on the training corpora. A decoding module 167 is used that maximizes the argument argmax/e P(e)*P(f|e), and maximizes the probability of e, given certain languages in the corpora, where e and f are words or phrases in the training corpora. The decoding module 167, which may simply be a module within the same unit as the training module. The decoder thus takes a new Chinese string such as 160, and uses the probabilities 165 along with a language model 161 which may be an n-gram language model. The decoder outputs English strings which correspond to the highest scores based on the probabilities and the language model.

Phrase based systems may sometimes yield the most accurate translations. However, these systems are often too weak to encourage long-distance constituent reordering when translating the source sentences into a target language, and do not control for globally grammatical output.

Other systems may attempt to solve these problems using syntax. For example, certain reordering in certain language pairs can be carried out. One study has shown that many common translation patterns fall outside the scope of the Child reordering model of Yamada & Knight, even for similar language pairs such as English/French. This led to different possible alternatives. One suggestion was to abandon syntax on the grounds that syntax was a poor fit for the data. Another possibility is to maintain the valid English syntax while investigating alternative transformation models.

SUMMARY

The present application describes carrying out statistical analysis using trees created from the strings. In training, trees are created and used to form rules in addition to the probabilities. In application, trees are used as output, and either the trees, or information derived from the trees, may be output. The system may input strings of source symbols, and outputs target trees.

In an embodiment, transformation rules that condition on larger fragments of tree structure are created. These rules can be created manually, or automatically through corpus analysis to form a large set of such rules. Specific cases of crossing and divergence may be used to motivate the algorithms to create better explanation of the data and better rules.

The present description describes string to tree translation. Different aspects are described which enable a direct translation between the string and the syntax tree.

BRIEF DESCRIPTION OF THE DRAWINGS

These and other aspects will now be described in detail with reference to the accompanying drawings, wherein.

DETAILED DESCRIPTION

The general structure and techniques, and more specific embodiments which can be used to effect different ways of carrying out the more general goals are described herein.

Figure 2:
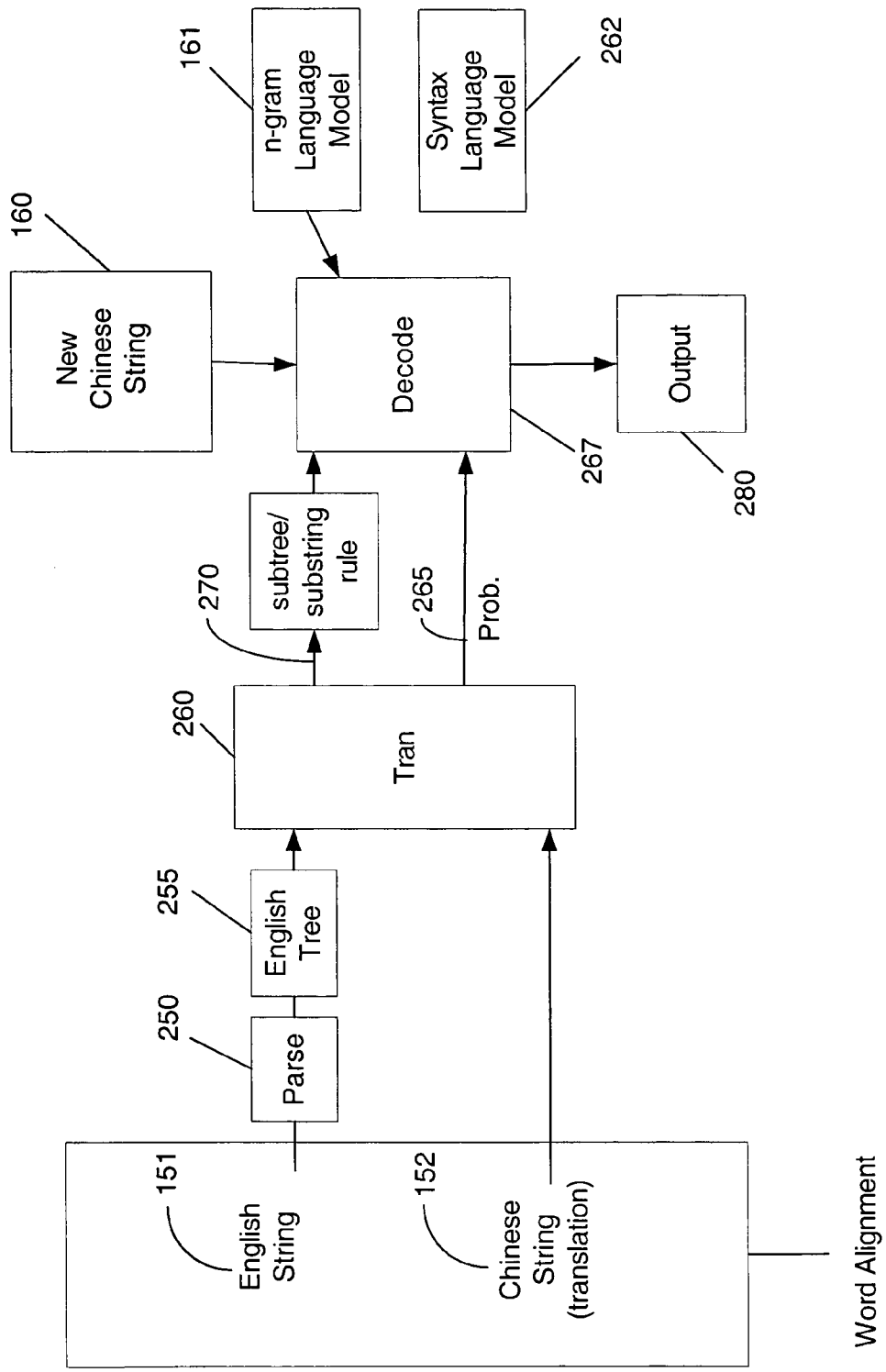
FIG. 2 shows an embodiment using tree portions as parts of the rules.
Figure 10:
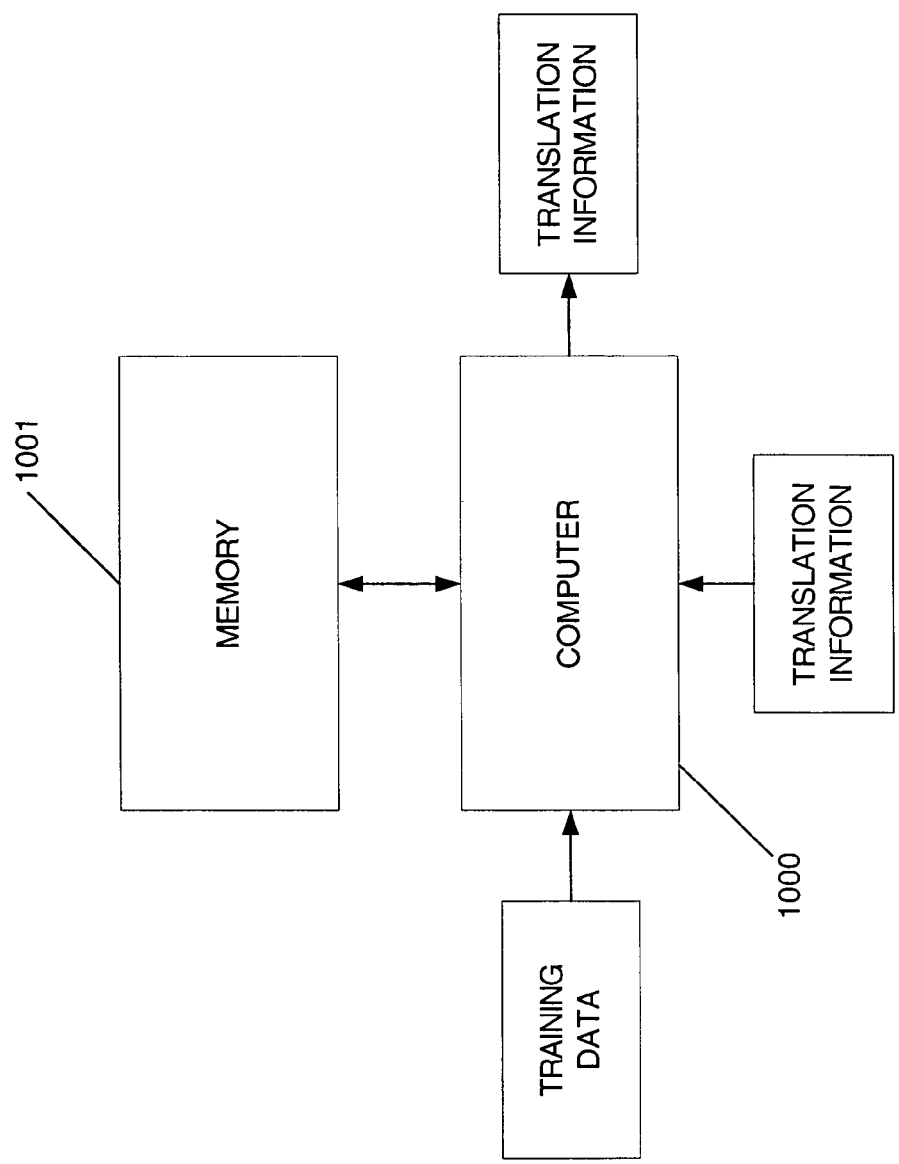

FIG. 2 illustrates an overall block diagram of an embodiment. In an embodiment, the rule learning is used for learning rules for a text to text application. The rule learning and the text to text application may each be carried out on a computer 1000 such as shown in FIG. 10, which includes an associated memory 1001 storing the translation rules, probabilities and/or models. The computers described herein may be any kind of computer, either general purpose, or some specific purpose computer such as a workstation. The computer may be a Pentium class computer, running Windows XP or Linux, or may be a McIntosh computer. The programs may be written in C, or Java, or any other programming language. The programs may be resident on a storage medium, e.g., magnetic or optical, e.g. the computer hard drive, a removable disk or other removable medium. The programs may also be run over a network.

In this embodiment, the English string 151 and Chinese string 152 are first word aligned by alignment device 251. The English string is parsed by a parser 250, as described herein, into an English tree 255 that represents the contents of the English string. The English tree is used along with the Chinese string 152 by a string based training module 260. The translation module 260 produces probabilities shown as 265, and also produces subtree/sub string rules indicative of the training, and shown as 270. Thus, the training device produces rules with probabilities, where at least a portion of at least some of these rules are in the form of trees.

The rules and probabilities are used by the decoding module 267 for subsequent decoding of a new Chinese string 160. Decoding module 267 also uses multiple language models, here an n-gram language model 161, and also a syntax based language model 262. The output 280 of the decoding module 267 corresponds to all possible English trees that are translations of the Chinese string according to the rules. The highest scoring English trees are displayed to the user. Alternatively, information that is based on those trees may be displayed, for example, string information corresponding to those trees.

Figure 1:
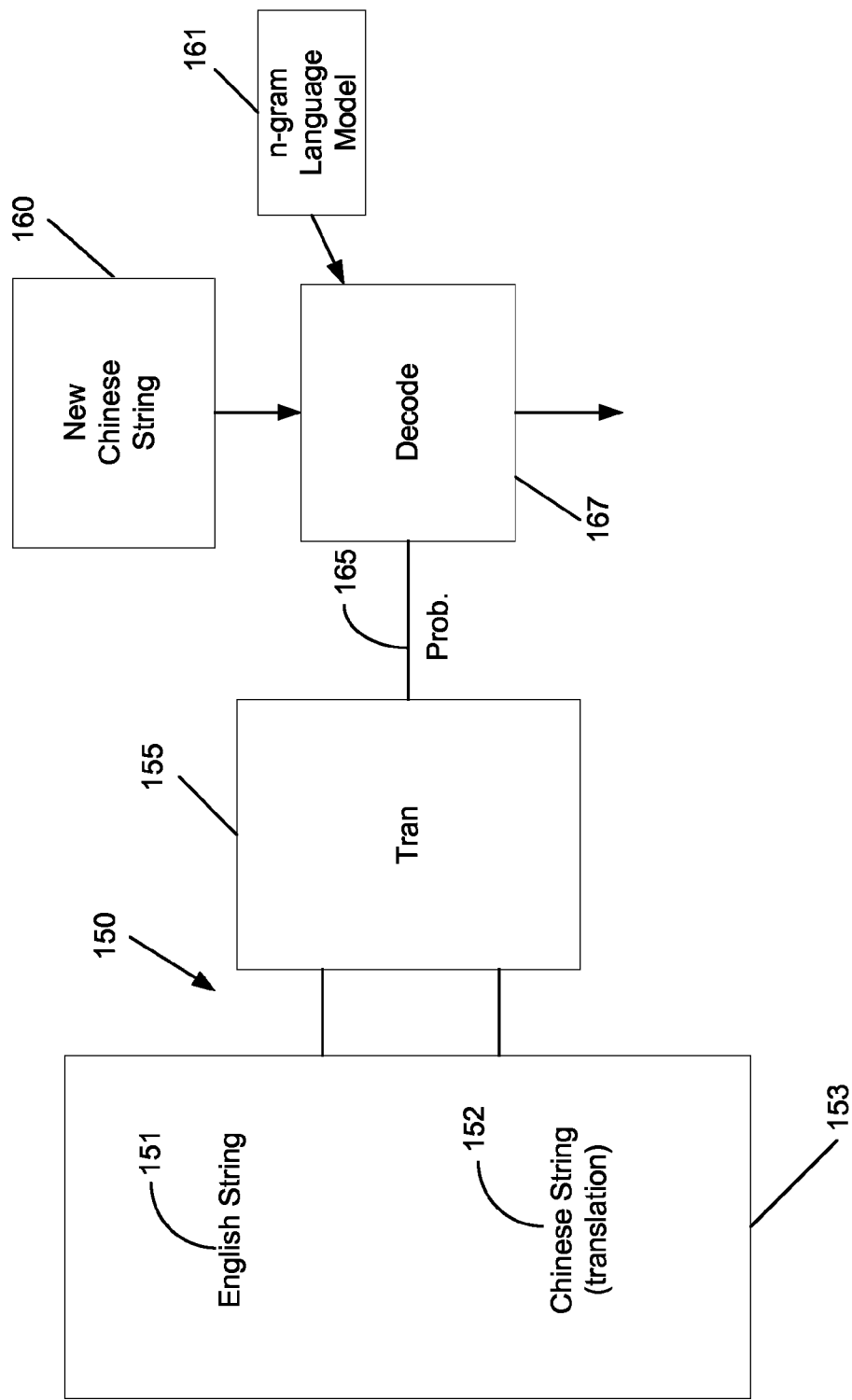
FIG. 1 shows a block diagram of a translation system.

Some advantages of the embodiment include the following. The use of information from trees within the rules can allow the model to learn what the different parts represent. For example, the FIG. 1 machine translation system has no idea what a noun is, but the embodiment can learn that as part of the translation. In addition, the present embodiment provides tree/string rules, as compared with the phrase substitution rules which are produced by the FIG. 1 system. The use of trees enables the use of the syntax based language model 262, which is not conventional in the prior art.

According to another embodiment, the training information in both languages may be parsed into trees prior to the training.

Tree outputs produce outputs which are well formed, having a verb in the right place, for example, and other parts also in the right places. In addition, tree/string rules capture information about when reordering may be useful. Tree/string rules control when to and when not to use function words. However, many of the tree string rules may be simple word to phrase substitutions.

The training is described herein with reference to FIGS. 3-9.

Figure 3A:
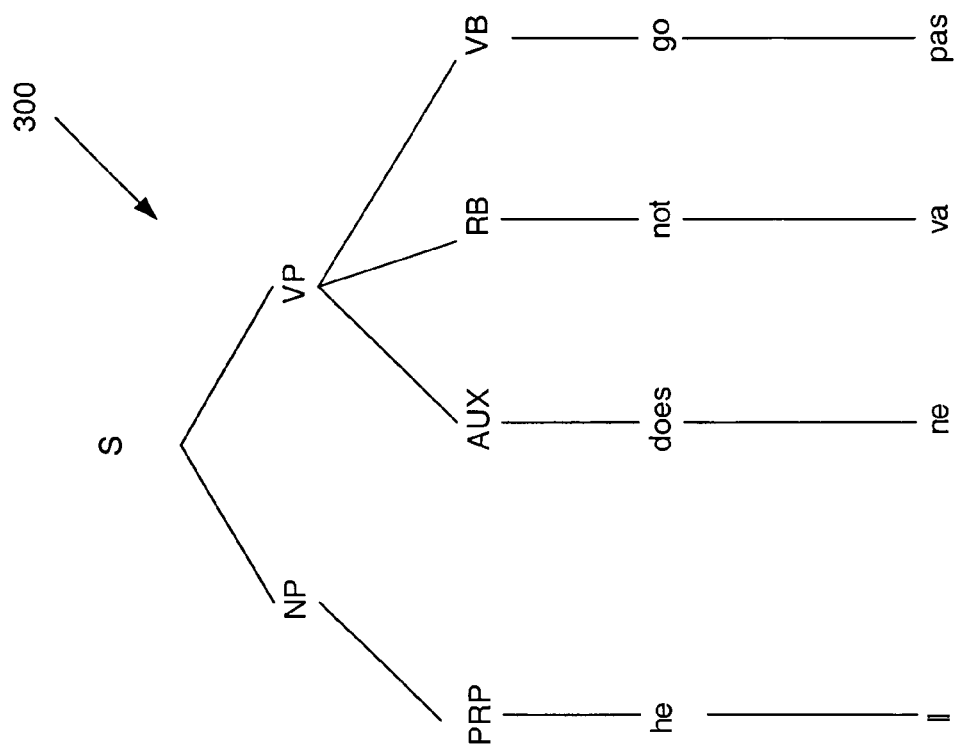
FIG. 3A-3C show formation of trees and alignment of the steps.

FIG. 3a shows a French sentence, (il ne va pas) and a parse tree 300 of its translation into English. The parse tree includes the conventional parsing parts, the sentence S, noun phrase (NP), verb phrase (VP) and other conventional sentence parts.

An embodiment defines determining rules using a string from a source alphabet that is mapped to a rooted target tree. Nodes of that rooted target tree are labeled from a target alphabet. In order to maintain this nomenclature, symbols from the source alphabet are referred to as being "source symbols". Symbols from the target alphabet are referred to as being "target symbols". A symbol tree is defined over an alphabet $\Delta$ as a rooted directed tree. The nodes of this alphabet are each labeled with a symbol of $\Delta$. In an embodiment, a process by which the symbol tree is derived from the string of source signals, over the target language, is captured. The symbol tree to be derived is called the target tree, since it is in the target language. Any subtree of this tree is called a target subtree.

A derivation string S is derived as an ordered sequence of elements, where each of the elements is either a source symbol or a target subtree.

The following is a formal definition of the derivation process. Given a derivation string S, a derivation step replaces the substring S of S with a target subtree T that has the following properties:

1. Any target subtree in S' is also a subtree of T,
2. Any target subtree in S that is not in S' does not share nodes with T, and
3. A derivation from a string S of source symbols to the target tree T is a sequence of derivation steps that produces T from S.

Figure 3B:
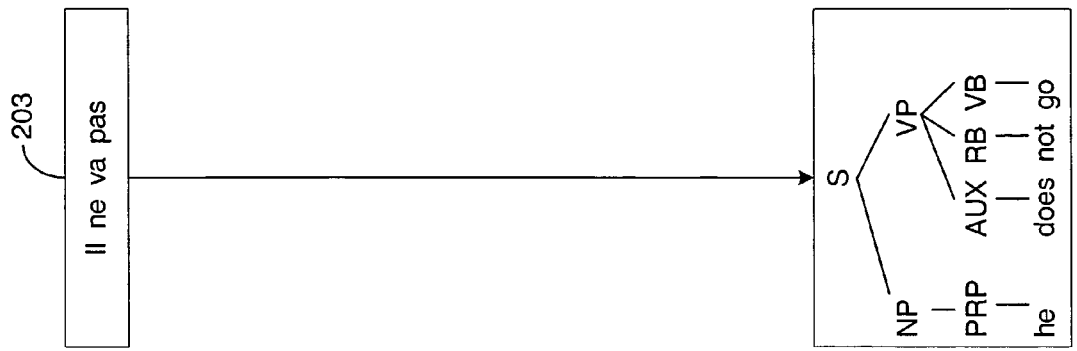
Figure 3B:
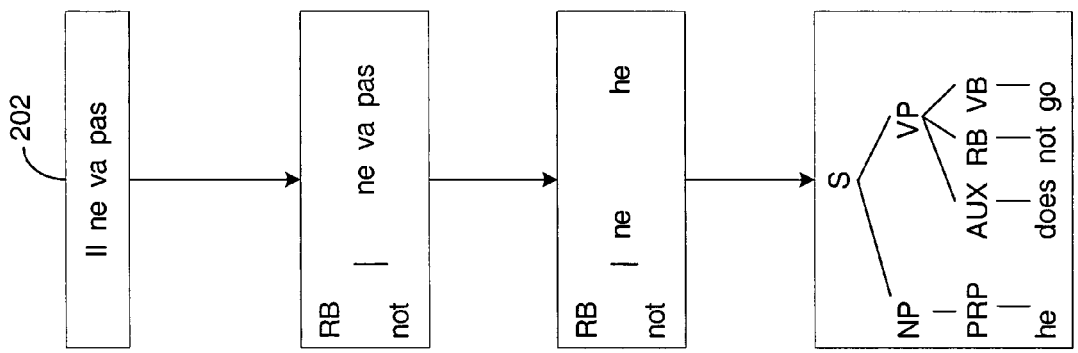
Figure 3B:
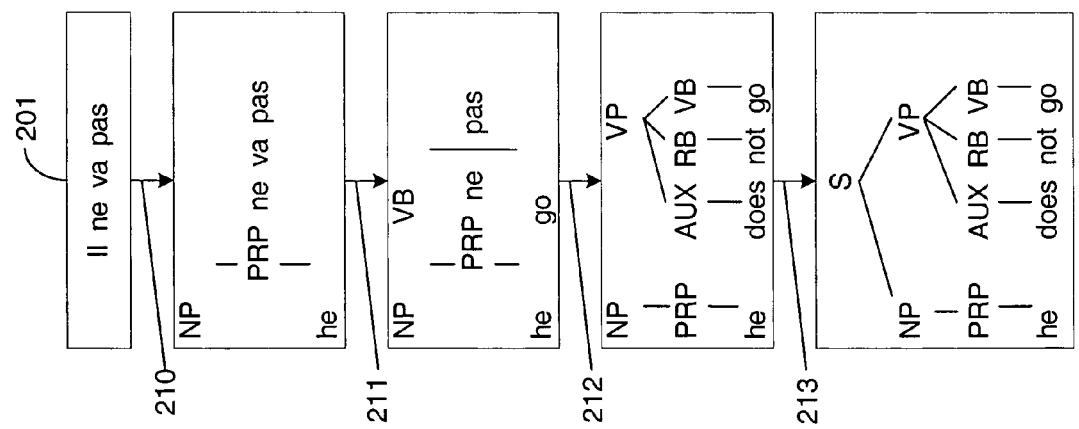

Consider the specific example of the alignment in FIG. 3a. FIG. 3B illustrates three different derivations of the target tree 300 from the source French string. The three derivations are labeled 201, 202 and 203. Each of these derivations are consistent with the definitions 1 through 3 above.

However, analysis of these derivations shows that at least one of the derivations is more "wrong" then the others. In the second derivation 202, for example, the word "pas" has been replaced by the English word "he", which is incorrect.

Alignment allows the training system to distinguish between a good derivation and a bad derivation. Alignment between S and T can be carried out in order to improve the possible derivations. If S is a string of source symbols, and T is a target tree, then the definitions would lead to the conclusion that each element of S is replaced at exactly one step in the derivation and, and to each node of T is created at exactly one step in the derivation. Thus, for each element s of $s_1$ a set called replaced(s, D) is created at the step of the derivation D during which s is replaced. This set keeps track of where in the derivation, different parts are replaced.

At 201, the word "va" is replaced in the second step of the derivation.

Each of the different derivations includes a number of "steps", each step, therefore, doing certain things. The derivation 201, for example, includes the steps 210, 211, 212, 213. In 201, for example, the French word "va" is replaced during the second step, 211, of the derivation. Thus, in notation form, files can be created which indicate the step at which the words are replaced. For example, here, Replaced(s,D)=2

Analogously, each node t of T can have a file defined called created (T,D) to be the step of derivation D during which t is created. In 201, the nodes labeled by auxiliary and VP (verb phrase) are created during the third step 212 of the derivation. Thus, created (AUX, D)=3 and created(VP,D)=3.

Given a string S of source symbols and a target tree T, an alignment A with respect to S and T forms a relation between the leaves of T and the elements of S. If derivation D between S and T is selected, then the alignment induced by D is created by aligning an element s of S with a leaf node t of T, but if and only if the replaced(s, D) is equal to the created(T, D). In other words, a source word is "aligned" with the target word if the target word is created during the same step as that in which the source word is replaced.

Figure 3C:
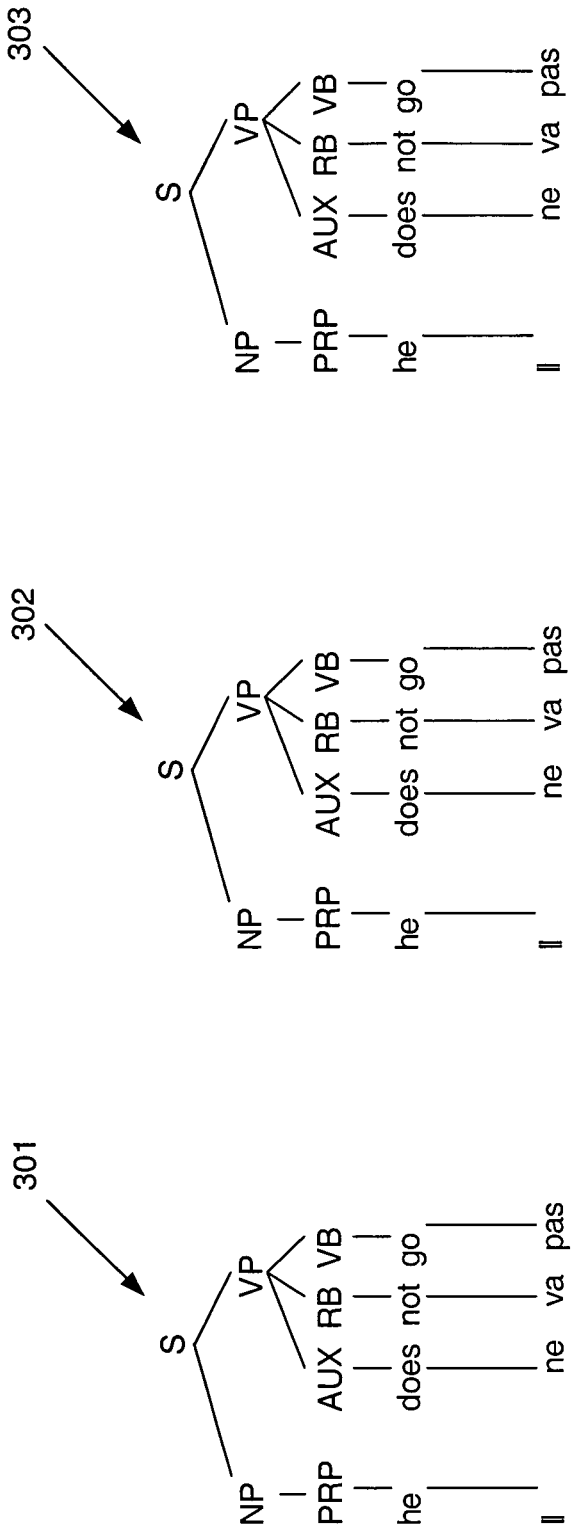

FIG. 3C illustrates alignments. The tree 301 in FIG. 1 corresponds to the derivation 201 in FIG. 3B. Analogously, 302 corresponds to 202 and 303 corresponds to 203. A rule to analyze the derivations is described. The set of "good" derivations according to an alignment A is precisely that set of derivations that induce alignments A', such that A is a sub alignment of A'. The term sub alignment as used herein requires that $A \subseteq A'$. Since alignments are simple mathematical relationships, this is relatively easy to determine. Another words, A is a sub alignment of A' if A aligns 2 elements only if A' also aligns those two elements. This is intuitively understandable from FIGS. 3B and 3C. The two derivations that seem correct at a glance include derivations 201 and 203. These are superalignments of the alignment given in FIG. 3A. The derivation 202 which is clearly wrong is not such a super alignment.

Notationally speaking, the derivation is admitted by an alignment A if it induces a super alignment of A. The set of derivations between source string S and target string T that are admitted by the alignment A can be denoted by $\delta_A (S, T)$ In essence, each derivation step can be reconsidered as a rule. This, by compiling the set of derivation steps used in any derivation of $\delta A(S, T)$, the system can determine all relevant rules that can be extracted from (S, T, A). Each derivation step is converted into a usable rule according to this embodiment. That rule can be used for formation of automated training information.

Derivation step 212 in derivation 201 begins with a source symbol "ne", which is followed by a target subtree that is rooted at VB and followed by another source symbol "pas". These three elements of the derivation are replaced, by the derivation, with a target subtree rooted at VP that discards the source symbols and contains the started target subtree rooted at VB.

Figure 4:
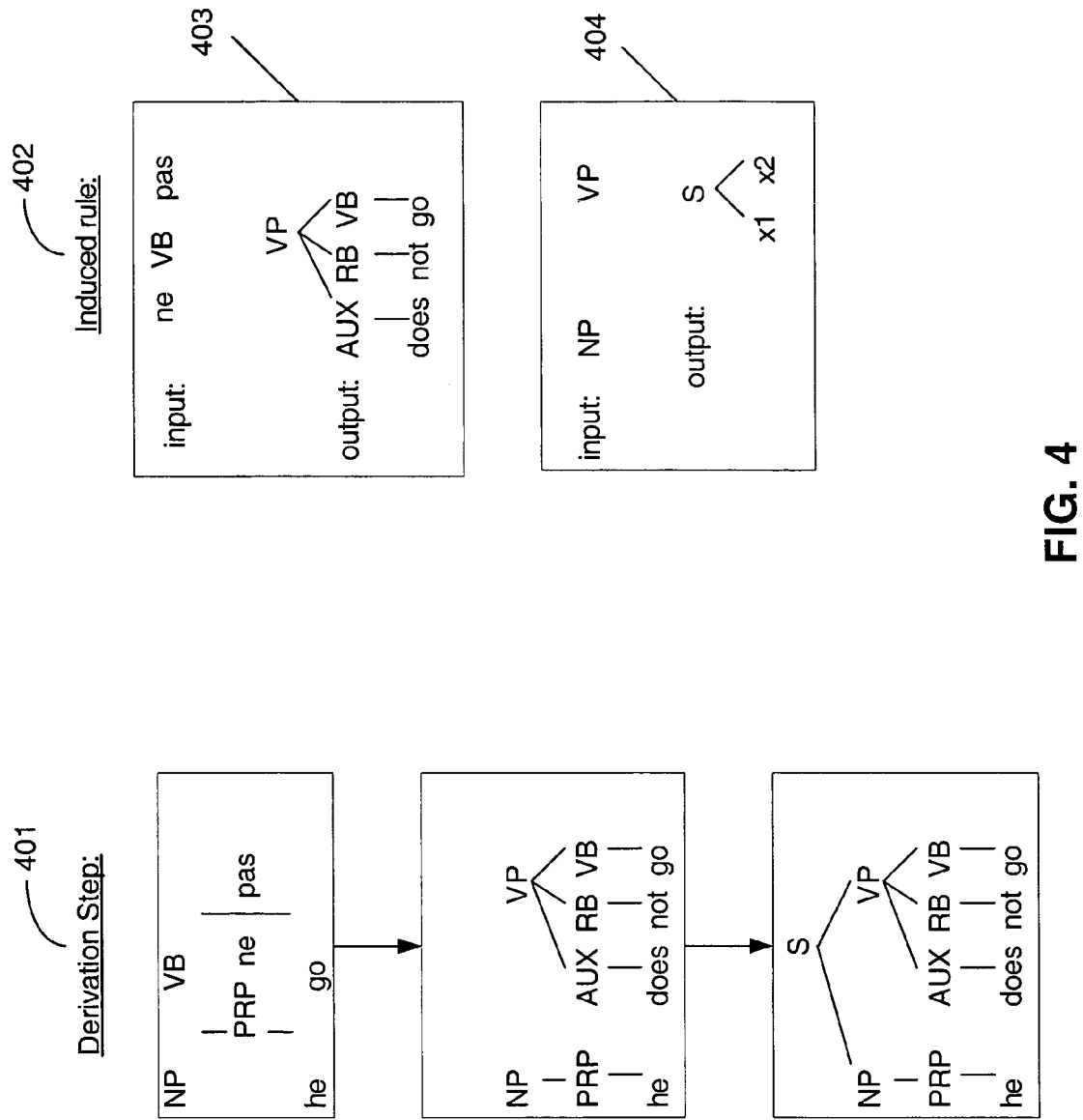
FIG. 4 shows derivation steps and the induced rules therefrom.

FIG. 4 illustrates how this replacement process can be captured by a rule. 401 shows the derivation step on the left, where the elements are replaced with other elements. 402 shows the induced rule that is formed. The input to the rule 402 include the roots of the elements in the derivation string that are being replaced. Here, the root of the symbol is defined as being the symbol itself. The output of the rule is a symbol tree. The tree may have some of its leaves labeled with variables rather than symbols from the target alphabet. The variables in the symbol tree correspond to the elements of the input to the rule. For example, the leaf labeled x2 in the induced tree means that when this rule is applied, x2 is replaced by the target subtree rooted at VB, since VB is the second element of the input. The two induced rules 403 and 404 are obtained from the respective derivations. Thus this rule format may be a generalization of CFG rules. Each derivation step can use this system to map to a rule in this way.

Hence, given a source string S, a target string T, and an alignment A, the set δA(S, T) can be defined as the set of rules in any derivation DϵδA(S, T). This set of rules is the set of rules that can be inferred from the triple (S, T, A)

Figure 5:
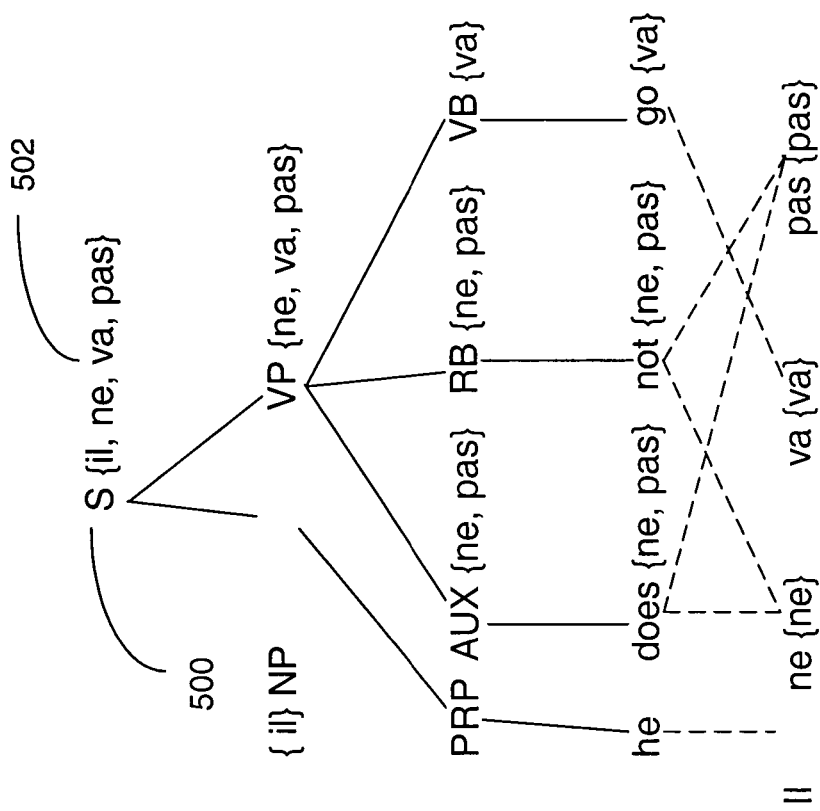
FIG. 5 shows an alignment graph.
Figure 6:
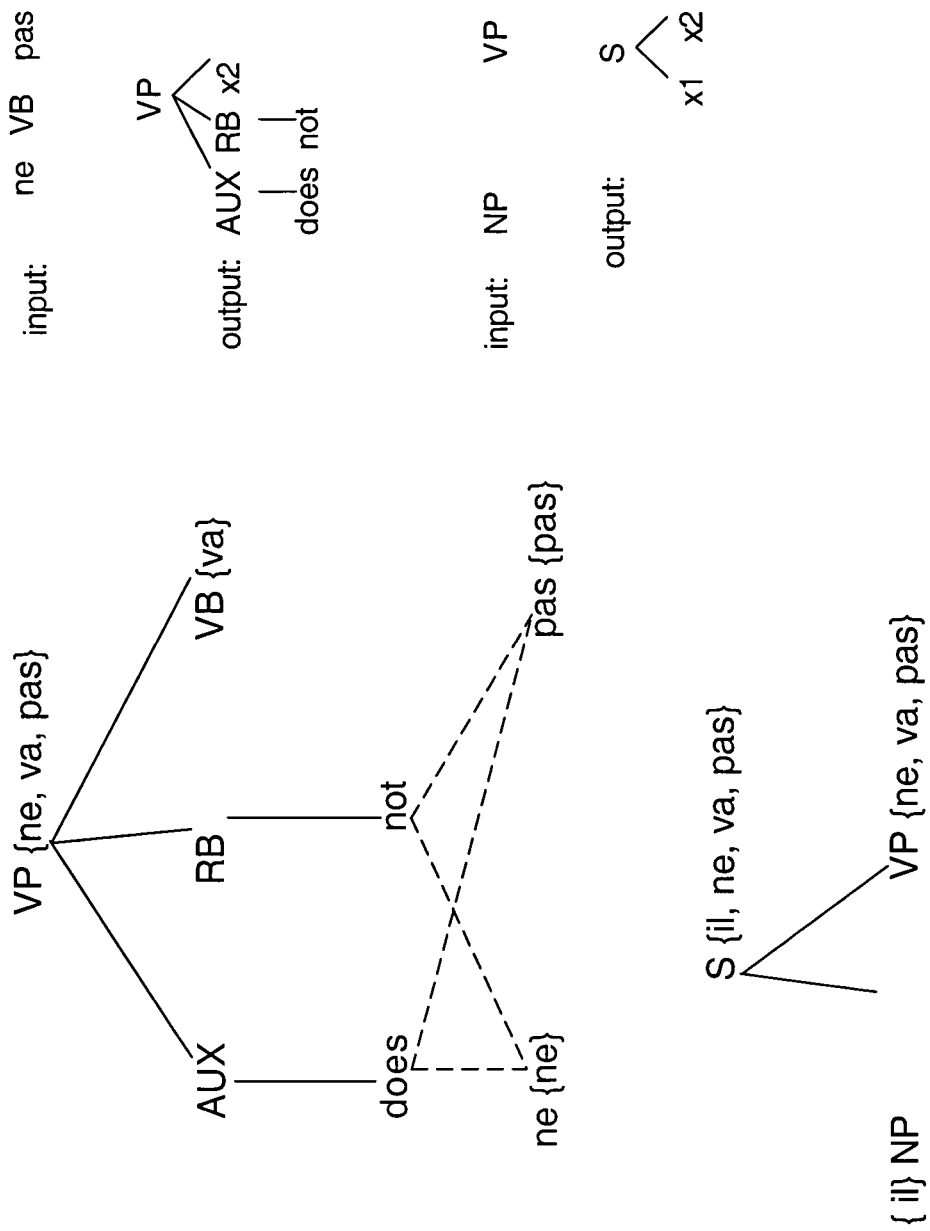
FIGS. 6 and 7 show minimal fragments derived from the FIG. 5 alignment graph.

In an embodiment, the set of rules δA(S, T) can be learned from the triple (S, T, A) using a special alignment graph of the type shown in FIG. 5. The alignment graph is a graph that depicts the triple (S, T, A) as a rooted, directed, acyclic graph. FIG. 5 is shown with direction as being top-down, but it should be understood that this can alternatively very easily be turned upside down. In an embodiment, certain fragments of the alignment graph are converted into rules of δA(S, T). A fragment is defined herein as being a directed acyclic graph and G as a nontrivial subgraph G' if a node A is in G'. Here, nontrivial means that the graph has more than just a single mode. The subgraph G' is such that if the node n is in G' then either n is a sink node of G' (a node with no children) or all of n's children are in G' and connected to all of the nodes thereof. FIG. 6 illustrates graph fragments formed from the alignment graph of FIG. 5.

The span of the node N of the alignment graph constitutes the subset of nodes from S that are reachable from n. A span is defined as being contiguous if it contains all the elements in a contiguous sub string of S. The closure of span (n) is the shortest contiguous span which is a superset of span (n) for example, the closure of (s2, s3, s5, s7) would be (s2, s3, s4, s5, s6, s7). The alignment graph of FIG. 5 is annotated with the span of each node. For example, each node, such as 500, has an annotation 502 that represents the span of that node.

One aspect is to determine the smallest set of information from these graphs that can form the set of rules. According to this aspect, first smaller parts of the rules are found, and then the rules are put together to form larger parts. The chunk can be defined in different ways—in an embodiment, certain fragments within the alignment graph are defined as being special fragments called frontier graph fragments. Frontier sets of the alignment graph include the set of nodes n in which each node n' of the alignment graph, that is connected to n but is neither an ancestor nor a descendent of n, span(n') ∩ closure(span (n))=0. The frontier set in FIG. 5 is shown in bold face and italics.

The frontier graph fragment of an alignment graph is the graph fragment where the root and all sinks are within the frontier set. Frontier graph fragments have the property that the spans of the sinks of the fragment are each contiguous. These spans form a partition of the span of the root, which is also contiguous. A transformation process between spans and roots can be carried out according to the following:

1) first, the sinks are placed in the order defined by the partition. The sink whose span is the first part of the span of the root goes first. This is followed by the Se whose span is the second part of the span of the root. This forms the input of the rule.

2) Next, the sink nodes of the fragment are replaced with a variable corresponding to their position in the input. Then, the tree part of the fragment is taken, for example by projecting the fragment on T. This forms the output of the rule.

FIG. 6 illustrates certain graph fragments, and the rules: both input and output, that are generated from those graph fragments. Rules constructed according to the conversion between the alignment graph and the rules are within a subset which is called $\rho_A$ (S, T).

A number of rule extraction techniques are also described herein.

In a first embodiment, rules of $\rho_A(S, T)$ are extracted from the alignment graph by searching the space of graph fragments for frontier graph fragments. One conceivable problem with this technique, however, is that the search space of all fragments of a graph becomes exponential to the size of the graph. Thus, this procedure can take a relatively long time to execute. The technique can be improved by taking the following simplifications.

The frontier set of an alignment graph can be identified in a time that is linear to the size of the graph. The second simplification is that for each node N of the frontier set, there is a unique minimal frontier graph fragment rooted at n. Because of the definition of the frontier set, any node n' that is not in the frontier set can not have a frontier graph fragment rooted at n'. The definition of a minimal fragment requires that the frontier graph fragment is a subgraph of every other frontier graph fragment that has the Se route.

For an alignment graph that has k nodes, there are at most k minimal frontier graph fragments.

Figure 7:
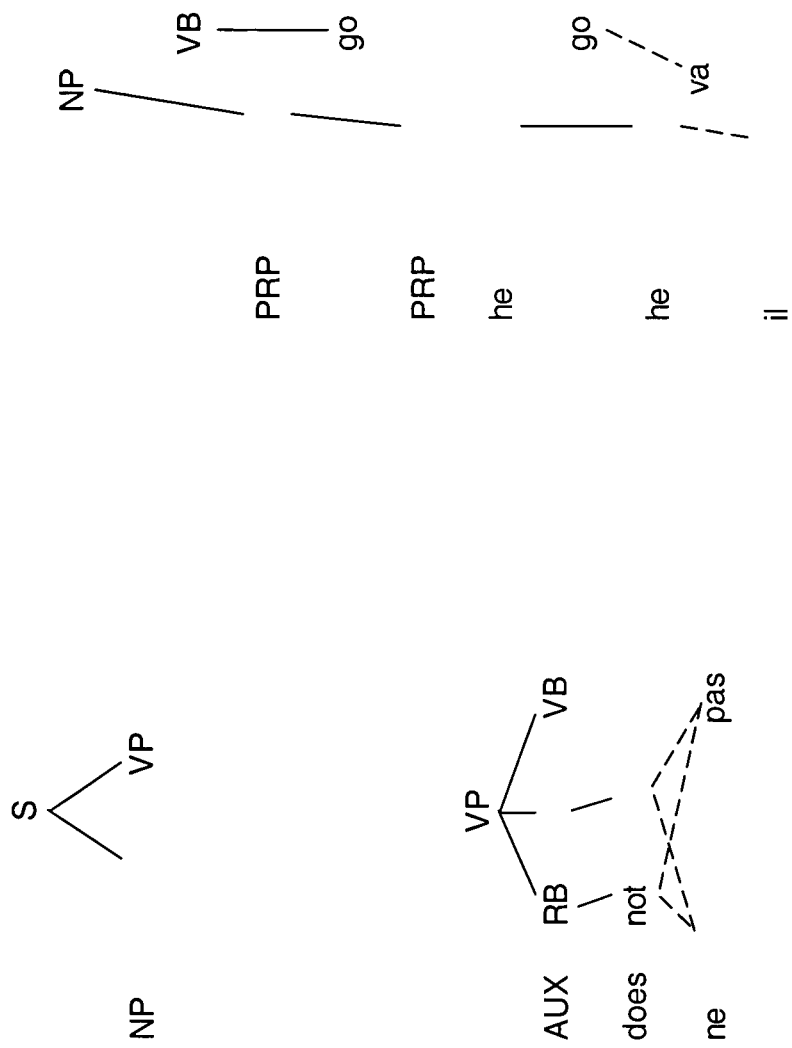
Figure 8:
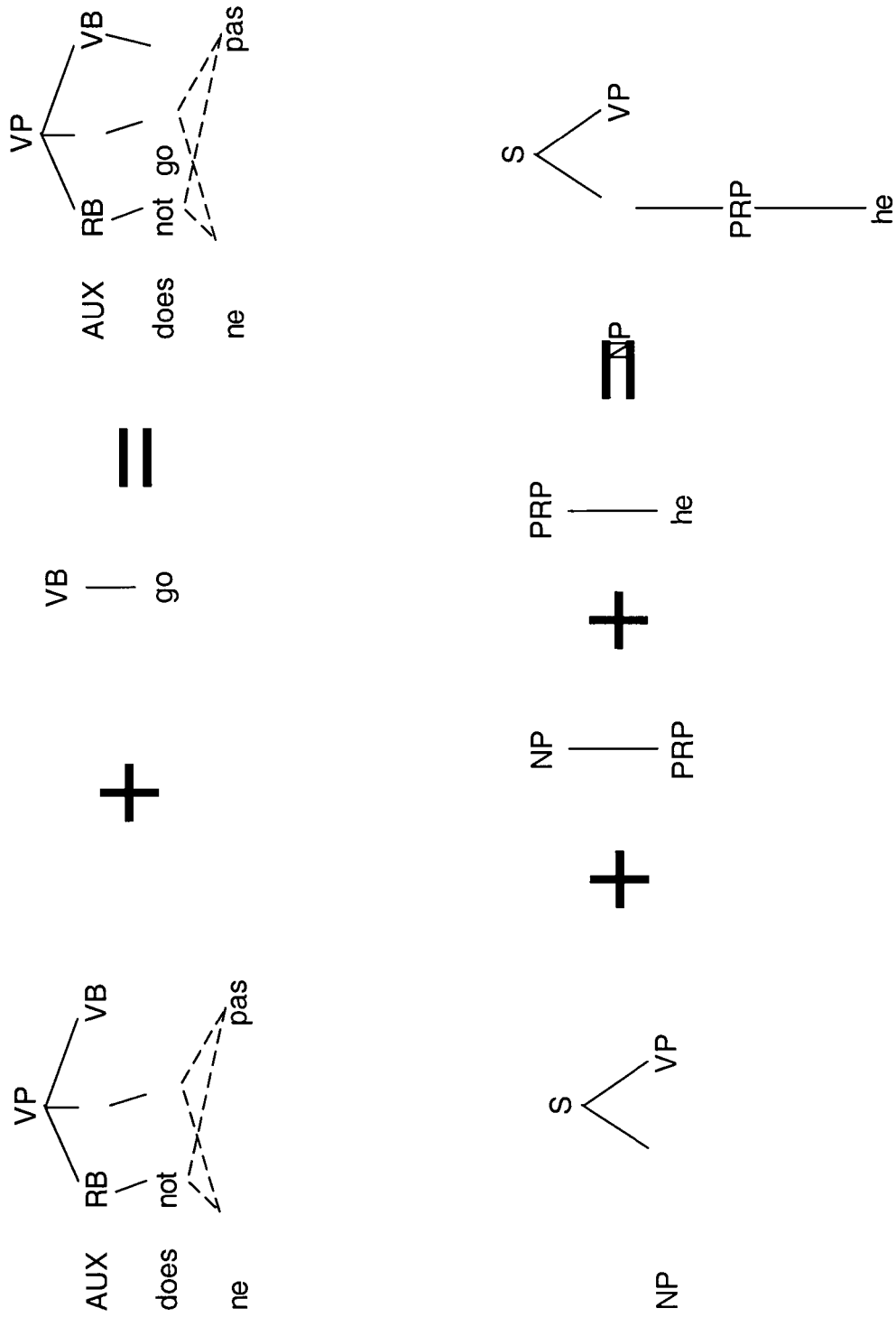
FIG. 8 shows how the minimal fragments are combined.

FIG. 7 shows the seven minimal frontier graph fragments from the alignment graph of FIG. 5. All of the other frontier graph fragments can be created by composing two or more minimal graph fragments. FIG. 8 illustrates how the other frontier graph fragments can be created in this way.

Figure 9:
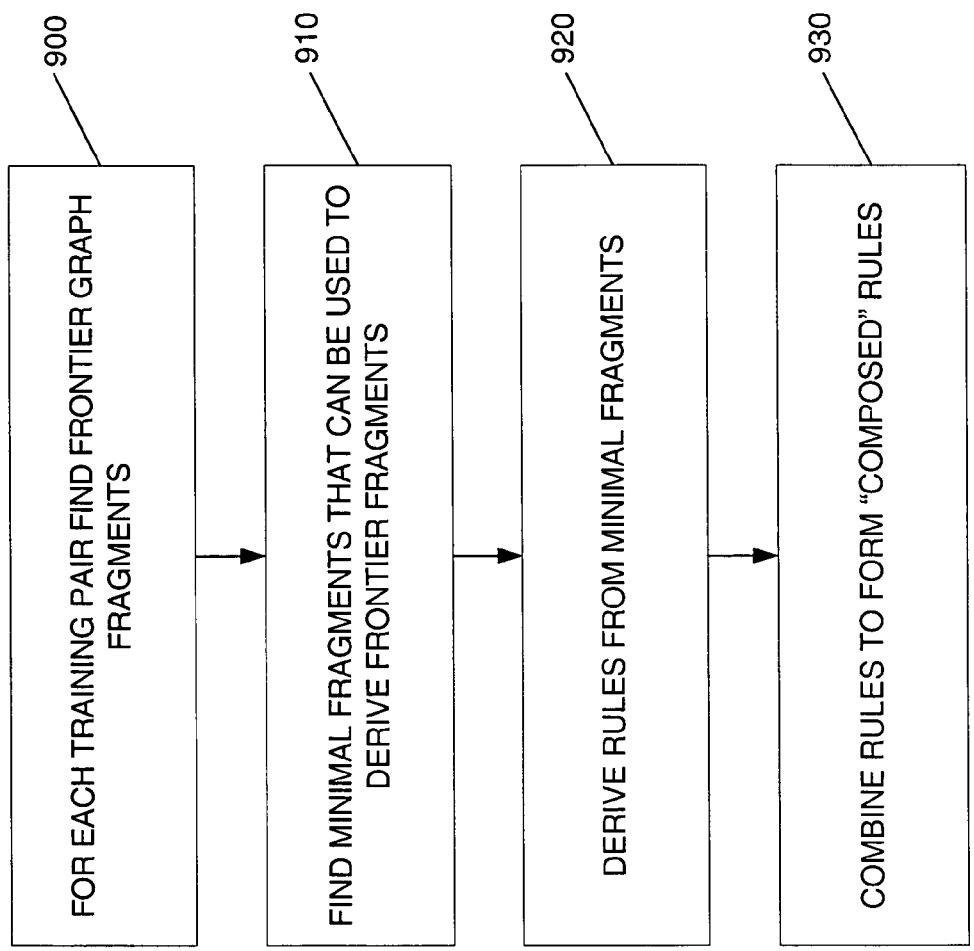
FIG. 9 shows a flowchart, run on the computer of FIG. 10.

Thus, the entire set of frontier graph fragments, as well as all the rules derivable from those fragments, can be computed systemically according to the flowchart of FIG. 9. The flowchart of FIG. 9 can be run on the computer system of FIG. 10, for example. At 900, the set of minimal frontier graph fragments is computed for each training pair. More generally, any minimal set of information that can be used as a training set can be obtained at this operation.

At 910, the set of graph fragments resulting from composing the minimal graph fragments is computed. This allows the rules derived from the main minimal frontier graph fragments to be regarded as a basis for all of the rules that are derivable from the frontier graph fragments.

The rules are actually derived at 920. These rules have been derived from the minimal fragments. The rules include trees, or information derived from those trees.

At 930, the rules from the minimal fragments are combined to form "composed" rules.

Thus, the extracting of rules becomes a task of finding the set of minimal frontier graph fragments of any given alignment graph.

This is carried out by computing the frontier set of the alignment graph. For each node of the frontier set, the minimal frontier graph fragment rooted at the node is determined. The computing of the frontier set can be computed in a single pass through the alignment graph. The frontier set is computed as the union of each node with its span and also with its complement span, which is the union of the complement span of its parents and the span of all its siblings. Here, siblings are nodes that share the same parent.

A node n is in the frontier set if and only if its complement span (n) ∩ closure(span(n)) is equal to 0. Thus, the complement span nearly summarizes the spans of all nodes that are neither ancestors nor descendents of n. This step requires only a single traverse through the graph and thus runs in linear time.

The second step of computing the minimal frontier graph fragment rooted at the node is also relatively straightforward. For each node n of the frontier set, n is expanded. As long as there is some sink node n' of the resulting graph fragment that is not in the frontier set, n' needs to be expanded also. After computing the minimal graph fragment rooted at the node of the frontier set, every node of the alignment graph has thus been expanded at most once. Hence, this operation can also run in linear time.

The above has simplified certain aspects; for example, unaligned elements are ignored. However, processes to accommodate these unaligned elements can be determined. This system computes all derivations corresponding to all ways of accounting for unaligned words, and collects rules from all the derivations. Moreover, these techniques can include derivations where sub strings are replaced by sets of trees rather than by one single tree.

This corresponds to allowing rules that do not require the output to be a single rooted tree. This generalization may allow explaining linguistic phenomena such as immediately translating "va" into "does go", instead of delaying the creation of the auxiliary word "does" until later in the derivation.

The above has been tested with a number of observations. The quality of alignment plays an important role in this derivation. Moreover, the technique which simplifies to running in linear time is barely affected by the size of the rules of abstracts, and produces good effects.

Figure 11:
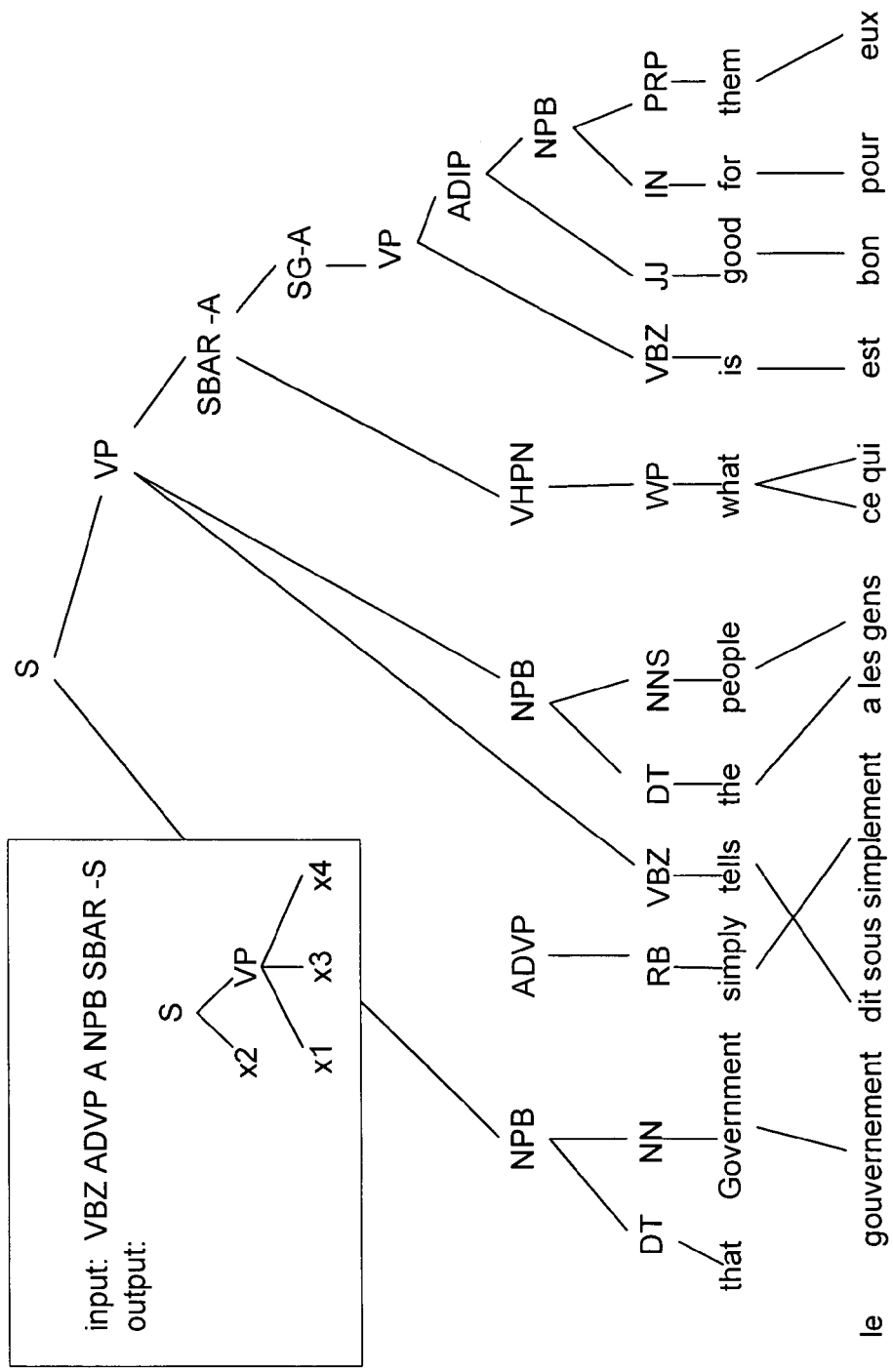
FIGS. 11 and 12 show crossing and reordering.

FIG. 11 identifies one cause of crossing between English and French which can be extended to other language pairs. Adverbs and French often appear after the verb, but this is less common in English. A machine parser creates a nested verb phrase when the adverbs are present. This prevents child reordering from allowing the verb and adverbs should be permeated. Multilevel reordering as shown in FIG. 11 can prevent or reduce these kinds of crossings.

One solution, initially suggested by Fox, may be to flatten the verb phrases. This constitutes a solution for this sentence pair. It may also account for adverb-verb reorderings. Flattening the tree structure is not necessarily a general solution since it can only apply to a very limited number of syntactic categories. Sometimes, however, flattening the tree structure does not resolve the crossing in the node reordering malls. In these models, a crossing remains between MD and AUX no matter how VPs are flattened.

Figure 12:
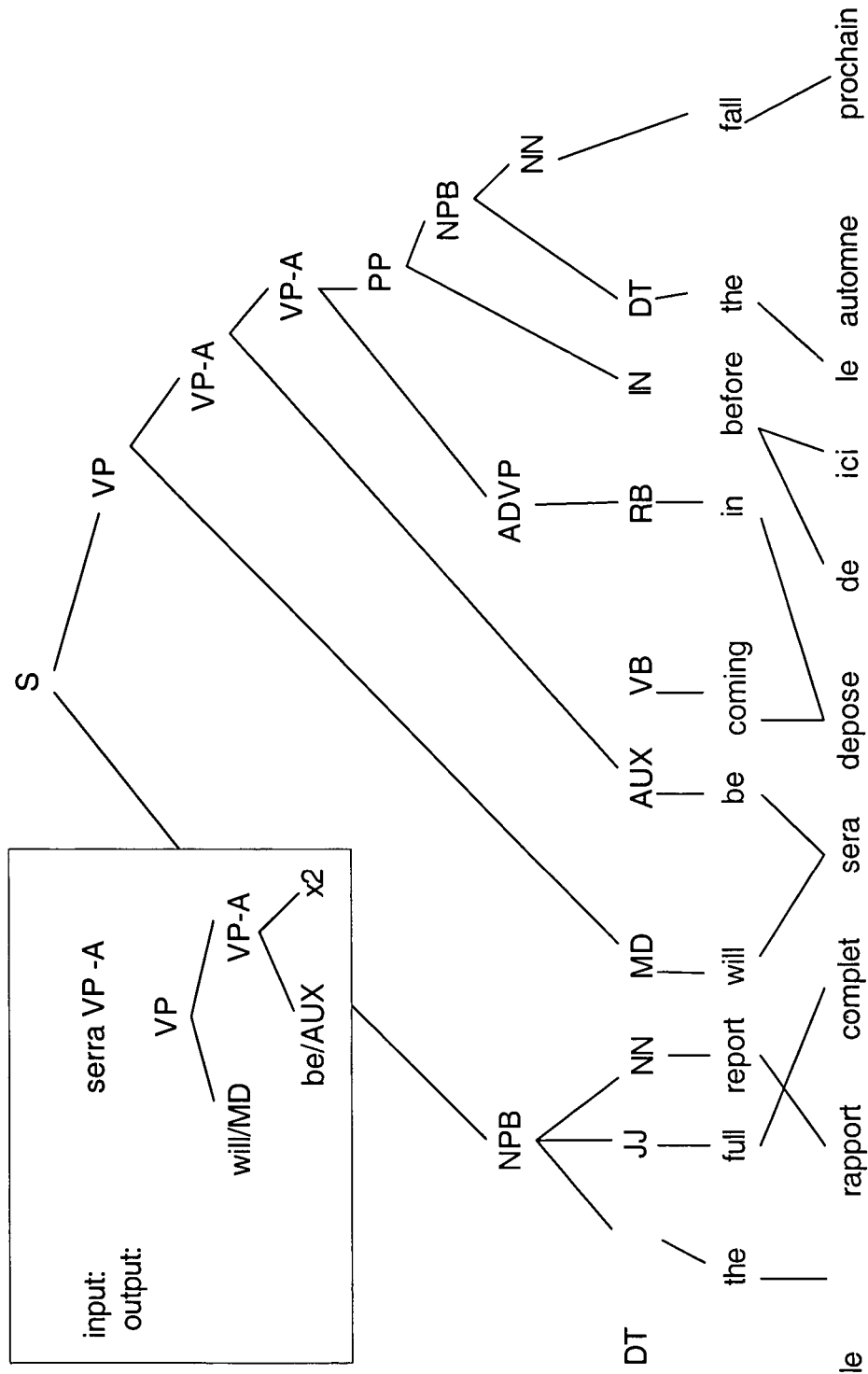

The transformation rule model creates a lexical rule as shown in FIG. 12 as 1200. This lexical rule allows transformation of "will be" into -sera-, as the only way to resolve the crossing.

These techniques can also be used for decoding, as described herein. This embodiment describes automatic translation of source natural language sentences into target natural language sentences using complex probabilistic models of word to word, phrase to phrase, syntactic and semantic rule translation. This also describes probabilistic word, syntax and semantic language models.

This second embodiment forms trees directly from the string based information, here, the input information being the information to be translated. The translation is constructed by automatically deriving a number of target language parse trees from the source language sentence that is given as input. Each tree is scored by a weighted combination between the probabilistic models, as well as an additional set of language features. The tree of maximum probability provides the translation into the target language.

This embodiment defines a cross-lingual parsing framework that enables developing statistical translation systems that use any type of probabilistic channel or target language model: any of word based, phrase based, syntax based or semantic based.

The channel and target language models can be trained directly from a parallel corpus using traditional parameter estimation techniques such as the expectation maximization algorithm. The models can alternatively be estimated from word or phrase aligned corpora that have been aligned using models that have no knowledge of syntax. In addition, this enables exploring a much larger set of translation possibilities.

In this embodiment, a target language parse tree is created directly from the source language string. All channel operations are embodied as one of the different type of translation rules. Some of these operations are of a lexical nature, such as the word to word or phrase to phrase translation rules. Other rules are syntactic.

Table 1 illustrates rules that are automatically learned from the data.

TABLE 1

1. DT(these) → 这
2. VBP(include) → 中包括
3. VBP(includes) → 中包括
4. NNP(France) → 法国
5. CC(and) → 和
6. NNP(Russia) → 俄罗斯
7. IN(of) → 的
8. NP(NNS(astronauts)) → 宇航．员
9. PUNC(.) → .
10. NP(x0:DT, CD(7), NNS(people) → x0, 7λ
11. VP(VBG(coming), PP(IN(from), x0:NP)) → *口, x0
12. IN(from) → *口
13. NP(x0:NNP, x1:CC, x2:NNP) → x0, x1, x2
14. VP(x0:VBP, x1:NP) → x0, x1
15. S(x0:NP, x1:VP, x2:PUNC) → x0, x1, x2
16. NP(x0:NP, x1:VP) → x1,的, x0
17. NP(DT("the"), x0:JJ, x1:NN) → x0, x1

These translation rules fall into a number of different categories.

Lexical simple rules are rules like numbers 1-7 that have one level syntactic constituents that dominate the target language part. These rules include a type of the word, the word itself, and the translation.

Lexical complex rules are rules like number 8, where there are multiple levels of syntactic constituents that dominate the target language part.

Rules 10, 11, 16 and 17 are lexically anchored complex rules. These rules explain how complex target syntactic structures should be constructed on top of mixed inputs. The mixed inputs can be lexical source language items and syntactic constituent target language constituents. For example, rule 16 says that if the Chinese particle ,的 occurs between two syntactic constituents x1 x0, then the resultant target parse tree is an NP with NP:x0 and X1:VP. In other words, this rule stores order information for the syntactic constituents between the languages.

The syntactic simple rules are rules like rule 13 which enable target syntactic structures to be derived. Finally, syntactic complex rules enable multiple level target syntactic structures to be derived. This technique can use cross lingual translation rules such as 11 and 16 that make reference to source language lexical items and target language syntactic components or constituents. Note that many of these rules include features that are actually tree based information written in string form. NP(DT ("the"), x0: . . . for example represents tree based information.

Figure 13:
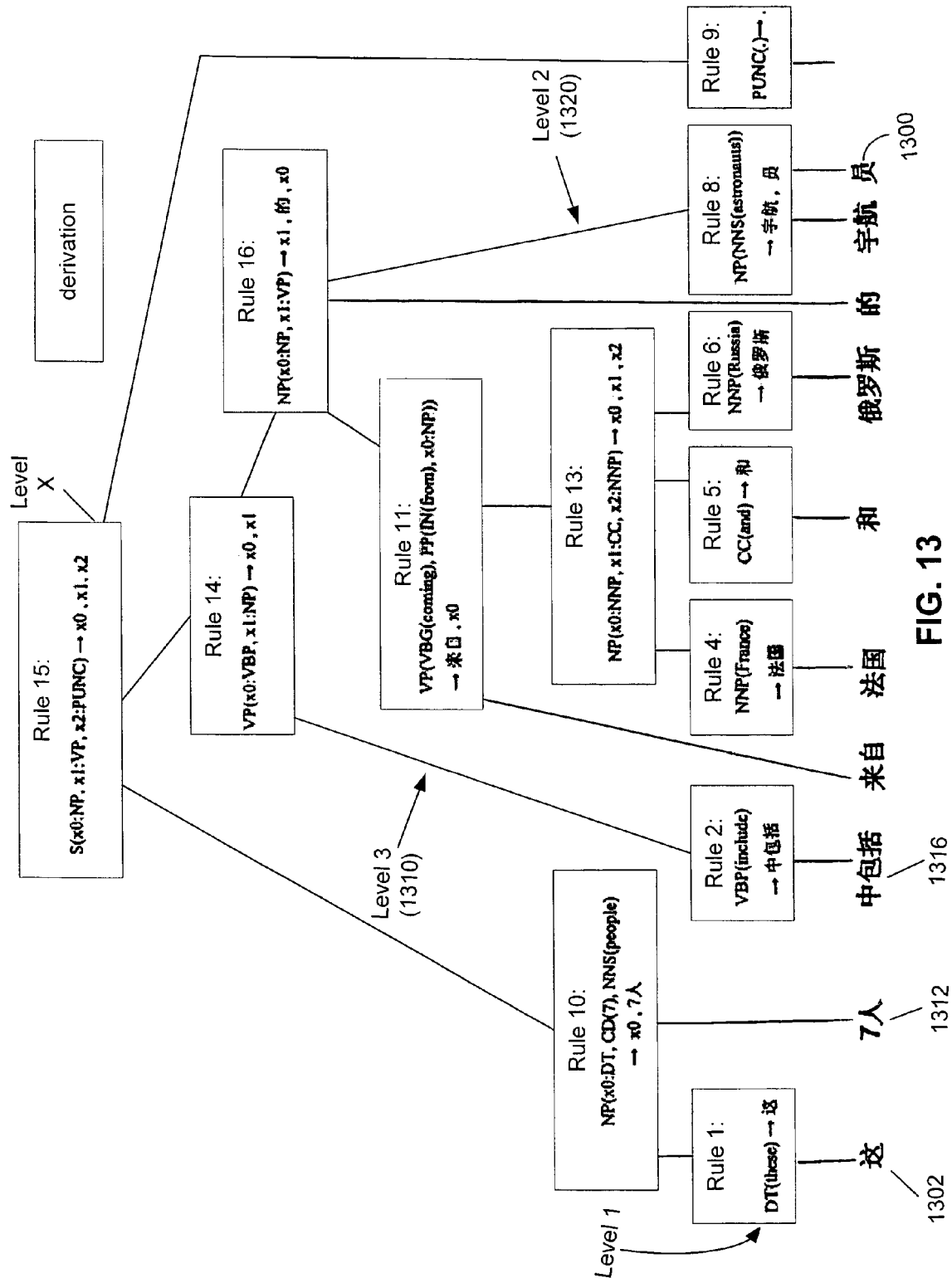
FIG. 13 shows a decoding rule.

FIG. 13 illustrates a syntactic tree form derivation for the input sentence. A top down traversal of this derivation enables the creation of the target sentence because each node in the derivation explicitly encodes the order in which the children need traversal in the target language.

The decoding is carried out using clusters of decoding according to different levels. At a first step, each of the rules is applied first to the individual words within the phrase 1300. Note that existing software has already divided the new Chinese string 160 into its individual words. Each word such as 1302 is evaluated against the rules set to determine if any rule applies to that word alone. For example, the word 1302 has an explicit rule 1304 (rule 1) that applies to that single word. This forms a first level of rules shown as rule level 1; 1310.

At level 2, each pair of words is analyzed. For example, the pair 1302, 1312 is analyzed by rule 1314. Similarly, the pair 1312, 1316 is analyzed to determine if any rules apply to that pair. For example, the rule 1314 applies to any word that is followed by the word 1312. Accordingly, rule 1314 applies to the word pair 1302, 1312. These dual compound rules form level 2; 1320 analogously, triplets are analyzed in level 3, and this is followed by quadruplets and the like until the top level rule shown as level x is executed.

Each of these rules includes strings for string portions within the rule. For example, rule 13 shows the information of a specific tree which is written in text format. The tree portion may include variables within the tree.

When this is all completed, the English tree is output as the translation, based on the tree that has the highest score among all the trees which are found.

Although only a few embodiments have been disclosed in detail above, other embodiments are possible and the inventor (s) intend these to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, different rules and derivation techniques can be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A computer implemented method, comprising:
   executing, by a processor, instructions stored in memory to use information that is based on corpora of string-based training information to create a plurality of rules that are based on the training information; and
   performing source language string to target language tree translation using an n-gram language model, a syntax-based language model, and the plurality of rules for an executable text to text application stored in memory, the plurality of rules including syntactic translation rules that are each associated with a probability for a translation, wherein a syntactic translation rule is determined by analyzing an alignment graph that includes a source string, a target tree, and an alignment of the source string and the target tree.

2. A computer implemented method as in claim 1, further comprising:
   obtaining a string to be translated;
   executing instructions stored in memory to compile sets of different possible translation trees using the rules; and
   executing instructions stored in memory to determine which of those translation trees represents probable translations.

3. A computer implemented method as in claim 2, further comprising executing instructions stored in memory to align a target word with a source word when the target word was created during a same process as that in which the source word is replaced.

4. A computer implemented method as in claim 2, wherein the compiling comprises:
   executing instructions stored in memory to find individual words;
   executing instructions stored in memory to find rules that apply to the individual words;
   executing instructions stored in memory to find combinations of the individual words; and
   executing instructions stored in memory to find rules that apply to the combinations of individual words.

5. A computer implemented method as in claim 2, wherein the compiling comprises compiling a complete set of derivation steps in any derivation of source string, target tree, and alignment.

6. A computer implemented method as in claim 5, wherein at least some elements in the trees are variables whose contents are defined by other trees.

7. A computer implemented method as in claim 6, wherein the alignment graph is used to determine an alignment by aligning source parts of a training corpora with target parts of the training corpora when the source part is created during the same step as that in which the source part is replaced.

8. A computer implemented method as in claim 7, wherein the alignment graph is analyzed to determine a smallest set of information that can form the set of rules.

9. A computer implemented method as in claim 8, wherein the smallest set of information includes frontier information.

10. A computer implemented method as in claim 1, further comprising executing instructions stored in memory to use parameter estimation techniques.

11. A computer implemented method as in claim 1, further comprising executing instructions stored in memory to flatten the trees to enable reordering of phrases.

12. A computer implemented method as in claim 1, further comprising:

executing instructions stored in memory to form an alignment graph that represents a conversion between nodes of the source string, leaves of the target tree, and alignment; and executing instructions stored in memory to convert fragments of the alignment graph into rules.

13. A computer implemented method as in claim 12, wherein the fragments include substrings of the source string, and a span for the substring.

14. A computer implemented method as in claim 1, wherein the rules are formed by determining operations at which source symbols are replaced by target subtrees and by forming rules from the replacement process.

15. A computer implemented method as in claim 14, wherein an output of the rule is a symbol tree with at least some of its leaves labeled with variables rather than symbols from a target alphabet.

16. A computer implemented method as in claim 1, wherein using the information comprises extracting translation rules from word aligned pairs.

17. A computer implemented method as in claim 16, wherein the word aligned pairs comprise a tree in a first language and a string in a second language.

18. The method according to claim 1, further comprising resolving a syntactic crossing by:
generating a frontier set for the alignment graph by determining minimal frontier fragments for the alignment graph;
assembling together at least a portion of the minimal frontier fragments to form one or more frontier graph fragments; and
generating a lexical rule by performing multi-level reordering of nodes within at least one frontier graph fragment to resolve the syntactic crossing.

19. A computer implemented method, comprising:
executing, by a processor, instructions stored in memory to align items of information in first and second different languages to form aligned information, wherein at least the information in the first language is in a tree form; and
executing, by a processor, instructions stored in memory to extract rules from the aligned information, the rules utilizable in conjunction with an n-gram model and a syntax based language model, the rules configured for use with performing source language string to target language tree translation using an n-gram language model, a syntax-based language model, and the plurality of rules for an executable text to text application stored in memory, the plurality of rules including syntactic translation rules that are each associated with a probability for a translation, wherein a syntactic translation rule is determined by analyzing an alignment graph that includes a source string, a target tree, and an alignment of the source string and the target tree.

20. A computer implemented method as in claim 19, wherein the information in both the first and second languages are in the tree form.

21. A computer implemented method as in claim 19, further comprising:
executing instructions stored in memory to form tree based information into an alignment graph that aligns between a string in the first language and a tree in the second language; and
executing instructions stored in memory to extract rules from the alignment graph.

22. A computer implemented method as in claim 21, further comprising executing instructions stored in memory to analyze a reduced set of fragments of the alignment graph prior to extracting the rules, wherein the rules are utilized to resolve crossings between a source string and a target tree.

23. A computer implemented method, comprising:
obtaining a string in a source language to be translated into a target language; and
executing, by a processor, instructions stored in memory to translate the string into the target language using at least one rule set, an n-gram language model, and a syntax based language model, wherein the at least one rule set comprises both rules that include at least parts of subtrees and probabilities, a rule set including translation rules in a subtree to substring rule form for a machine translation, the translation rules being associated with probabilities for the rules, wherein a translation rule is determined by analyzing an alignment graph that includes a source string, a target tree, and an alignment of the source string and the target tree.

24. A computer implemented method as in claim 23, wherein the translating comprises first applying rules to individual words, and then applying rules to combinations of words.

25. A computer implemented method as in claim 23, further comprising executing instructions stored in memory to output trees as the translation.

26. A computer implemented method as in claim 25, wherein the system produces a plurality of different trees as possible translations, and selects the best tree according to a highest probability.

27. A system comprising:
a training part executable by a processor and stored in memory, the training part receiving a corpora of string-based training information to create a plurality of rules that are based on the training information, the rules including parts of trees as components of the rules; and
a text to text application portion that uses an n-gram language model, a syntax-based language model, and the rules for a text to text application performing source language string to target language tree translation, the rules including translation rules in a subtree to substring rule form for a machine translation, the translation rules being associated with probabilities for the rules, wherein a translation rule is determined by analyzing an alignment graph that includes a source string, a target tree, and an alignment of the source string and the target tree.

28. A system as in claim 27, further comprising a memory that stores the rules including parts of trees that are translation rules in a subtree to substring rule form for a machine translation, and also stores probabilities for the rules.

29. A system as in claim 28, wherein the application portion obtains a string to be translated, compiles sets of different possible translation trees using the rules, and determines which of those translation trees represents probable translations.

30. A system as in claim 27, wherein the training part forms an alignment graph that represents a conversion between source, target, and alignment, and converts fragments of the alignment graph into rules.

31. A system as in claim 30, wherein the rules are formed by determining operations at which source symbols are replaced by target subtrees and forming rules from the replacement process.

32. A system as in claim 30, wherein the alignment graph is analyzed to determine a smallest set of information that can form the set of rules.

33. A system, comprising:
- a training module, executable by a processor and stored in a memory, that aligns items of information in first and second different languages to form aligned information and extracts rules from the aligned information,
- wherein at least the information in the first language is in a tree form, and the rules are utilizable in conjunction with an n-gram model and a syntax based language model, the tree form utilized in a source language string to target language tree translation, the rules including translation rules in a subtree to substring rule form for a machine translation, the translation rules being associated with probabilities for the rules, wherein a translation rule is determined by analyzing an alignment graph that includes a source string, a target tree, and an alignment of the source string and the target tree.

34. A system as in claim 33, wherein the information in both the first and second languages are in the tree form.

35. A system as in claim 33, wherein the training part forms tree based information into an alignment graph that aligns between the first language and the second language, and extracts rules from the alignment graph.

36. A system as in claim 33, wherein the training part forms a reduced set of fragments of the alignment graph prior to extracting the rules.

37. A system, comprising:
- a memory that stores at least one rule set that comprises both rules that include at least parts of subtrees and probabilities; and
- a decoding part that obtains a string in a source language to be translated into a target language, receives the at least one rule set, and uses the at least one rule set, an n-gram language model, and a syntax based language model to translate the string into the target language, the decoding part performing source language string to target language tree translation, a rule set including translation rules in a subtree to substring rule form for a machine translation, the translation rules being associated with probabilities for the rules, wherein a translation rule is determined by analyzing an alignment graph that includes a source string, a target tree, and an alignment of the source string and the target tree.

38. A system as in claim 37, wherein the decoding part first applies rules to individual words, and then applies rules to combinations of words.

39. A system as in claim 37, wherein the decoding part outputs trees as the translation.

40. A system as in claim 39, wherein the decoding part produces a plurality of different trees as possible translations, and selects the best tree according to a highest probability.

* * * * *